(12) United States Patent
Gardner et al.

(10) Patent No.: US 12,016,494 B2
(45) Date of Patent: Jun. 25, 2024

(54) BLENDER WITH REMOVABLE SPINDLE AND MONITORED RESERVOIR

(71) Applicant: f'Real! Foods, LLC, Emeryville, CA (US)

(72) Inventors: Clayton G. Gardner, Alamo, CA (US); Jens P. Voges, Tiburon, CA (US); Shek Fai Lau, Foster City, CA (US); Andrew Geppert, Blaine, MN (US)

(73) Assignee: fReal! Foods, LLC, Emeryville, CA (US)

( * ) Notice: Subject to any disclaimer, the term of this patent is extended or adjusted under 35 U.S.C. 154(b) by 0 days.

(21) Appl. No.: 17/893,403

(22) Filed: Aug. 23, 2022

(65) Prior Publication Data

US 2023/0056707 A1    Feb. 23, 2023

Related U.S. Application Data

(60) Continuation of application No. 16/393,824, filed on Apr. 24, 2019, now Pat. No. 11,419,458, which is a (Continued)

(51) Int. Cl.
  *A47J 43/00*    (2006.01)
  *A47J 43/044*   (2006.01)

(52) U.S. Cl.
  CPC .... *A47J 43/044* (2013.01); *A47J 2043/04472* (2013.01)

(58) Field of Classification Search
  CPC ................ A47J 43/044; A47J 2043/04472
  See application file for complete search history.

(56) References Cited

U.S. PATENT DOCUMENTS

| 1,496,611 A | 6/1924 | Siegel |
| 1,569,049 A | 1/1926 | Stufflebeam |
| (Continued) | | |

FOREIGN PATENT DOCUMENTS

| EP | 0115367 A2 | 8/1984 |
| EP | 0529287 A2 | 3/1993 |
| (Continued) | | |

OTHER PUBLICATIONS

Office Action issued from the Singapore Patent Office for related Application No. 11201706387R dated Dec. 17, 2021 (7 Pages).

(Continued)

*Primary Examiner* — Anshu Bhatia
(74) *Attorney, Agent, or Firm* — Michael Best & Friedrich LLP

(57) ABSTRACT

A blender includes a spindle support, a spindle motor secured to the spindle support, an inner spindle drive shaft permanently coupled to the spindle motor, and a spindle assembly removably coupled to the spindle support. The spindle assembly includes a quick release coupler, a tube, and a blending tool fixed to an end of the tube. The blending tool includes a plurality of blades. The inner spindle drive shaft extends into the tube and is drivably coupled to the tube to transmit rotational energy from the spindle motor to blending tool via the tube when the spindle assembly is coupled to the spindle support.

20 Claims, 30 Drawing Sheets

Related U.S. Application Data division of application No. 15/015,069, filed on Feb. 3, 2016, now Pat. No. 10,299,628.

(60) Provisional application No. 62/112,116, filed on Feb. 4, 2015.

(56) References Cited

U.S. PATENT DOCUMENTS

| | | | |
|---|---|---|---|
| 2,755,900 | A | 7/1956 | Seyfried |
| RE24,607 | E | 2/1959 | Seyfried |
| 5,803,377 | A | 9/1998 | Farrell |
| 5,962,060 | A | 10/1999 | Farrell |
| 6,041,961 | A | 3/2000 | Farrell |
| 6,149,035 | A | 11/2000 | Gorski et al. |
| 6,326,047 | B1 | 12/2001 | Farrell |
| 6,465,034 | B2 | 10/2002 | Farrell |
| 6,474,862 | B2 | 11/2002 | Farrell |
| 6,527,207 | B1 | 3/2003 | Farrell et al. |
| 7,144,150 | B2 | 12/2006 | Farrell |
| 7,520,658 | B2 | 4/2009 | Farrell |
| 7,520,662 | B2 | 4/2009 | Farrell |
| 8,336,731 | B2 | 12/2012 | Farrell et al. |
| 8,763,515 | B2 | 7/2014 | Farrell et al. |
| 8,905,626 | B2 | 12/2014 | Farrell et al. |
| 2002/0031047 | A1 | 3/2002 | Fromm |
| 2004/0261629 | A1 | 12/2004 | Naud et al. |
| 2008/0279040 | A1 | 11/2008 | Neilson |
| 2009/0158941 | A1 | 6/2009 | Lee et al. |
| 2011/0088568 | A1 | 4/2011 | Farrell et al. |
| 2011/0090756 | A1 | 4/2011 | Farrell et al. |
| 2012/0087203 | A1 | 4/2012 | Williams et al. |
| 2013/0341439 | A1 | 12/2013 | Farrell et al. |
| 2013/0341446 | A1 | 12/2013 | Farrell et al. |
| 2013/0343150 | A1 | 12/2013 | Farrell et al. |
| 2013/0344221 | A1* | 12/2013 | Farrell ............... B01F 27/00 426/531 |
| 2014/0313851 | A1 | 10/2014 | Pryor, Jr. et al. |
| 2015/0190014 | A1 | 7/2015 | Farrell et al. |

FOREIGN PATENT DOCUMENTS

| | | |
|---|---|---|
| GB | 178719 A | 4/1922 |
| JP | H0574442 U | 10/1993 |
| JP | 2003310452 A | 11/2003 |
| JP | 2004041251 A | 2/2004 |
| JP | 2012102780 A | 5/2012 |
| KR | 1020050107745 A | 11/2005 |
| KR | 1020090101335 A | 9/2009 |
| WO | 2013119495 A1 | 8/2013 |

OTHER PUBLICATIONS

Office Action issued from the Israel Patent Office for related Application No. 253654 dated Dec. 22, 2020 (5 Pages).
Office Action issued from the Japanese Patent Office for related Application No. 202-056196 dated Jan. 5, 2022 (8 Pages including English Translation).
Office Action issued from the Korean Patent Office for related Application No. 1020177024284 dated Mar. 29, 2022 (7 Pages with English Translation).
Office Action issued from the Canadian Patent Office for related Application No. 2975451, dated Apr. 28, 2022 (3 Pages).
International Search Report—International Application No. PCT/US16/16624, dated Jun. 24, 2016 (3 Pages).
Mexican Patent Office Action for Application No. MX/a/2021/007101 dated Apr. 27, 2022 (9 pages including English translation).
Korean Patent Office Action for Related Application No. 10-2022-7045360 dated Feb. 10, 2023 (9 pages, including an English translation).

* cited by examiner

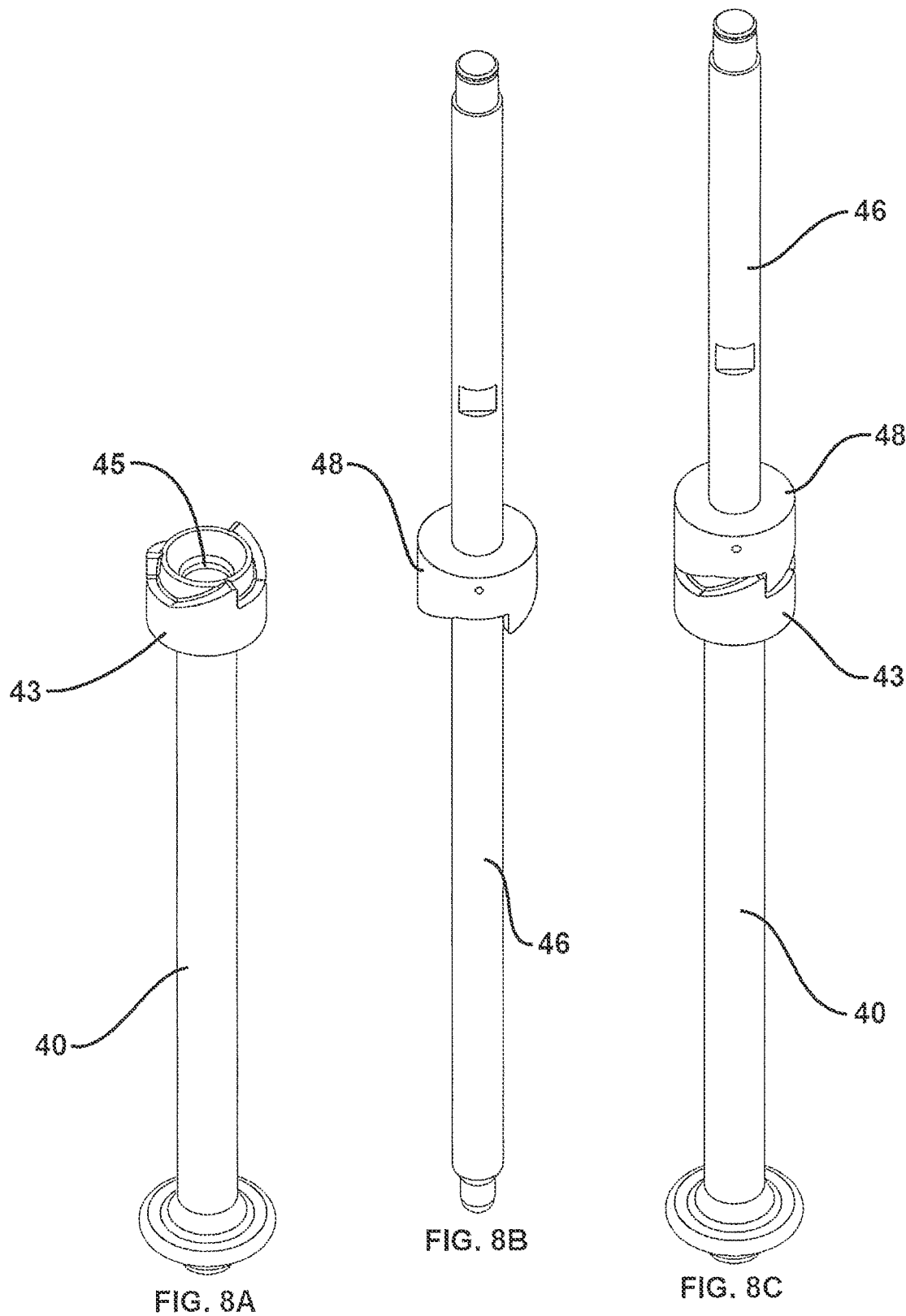

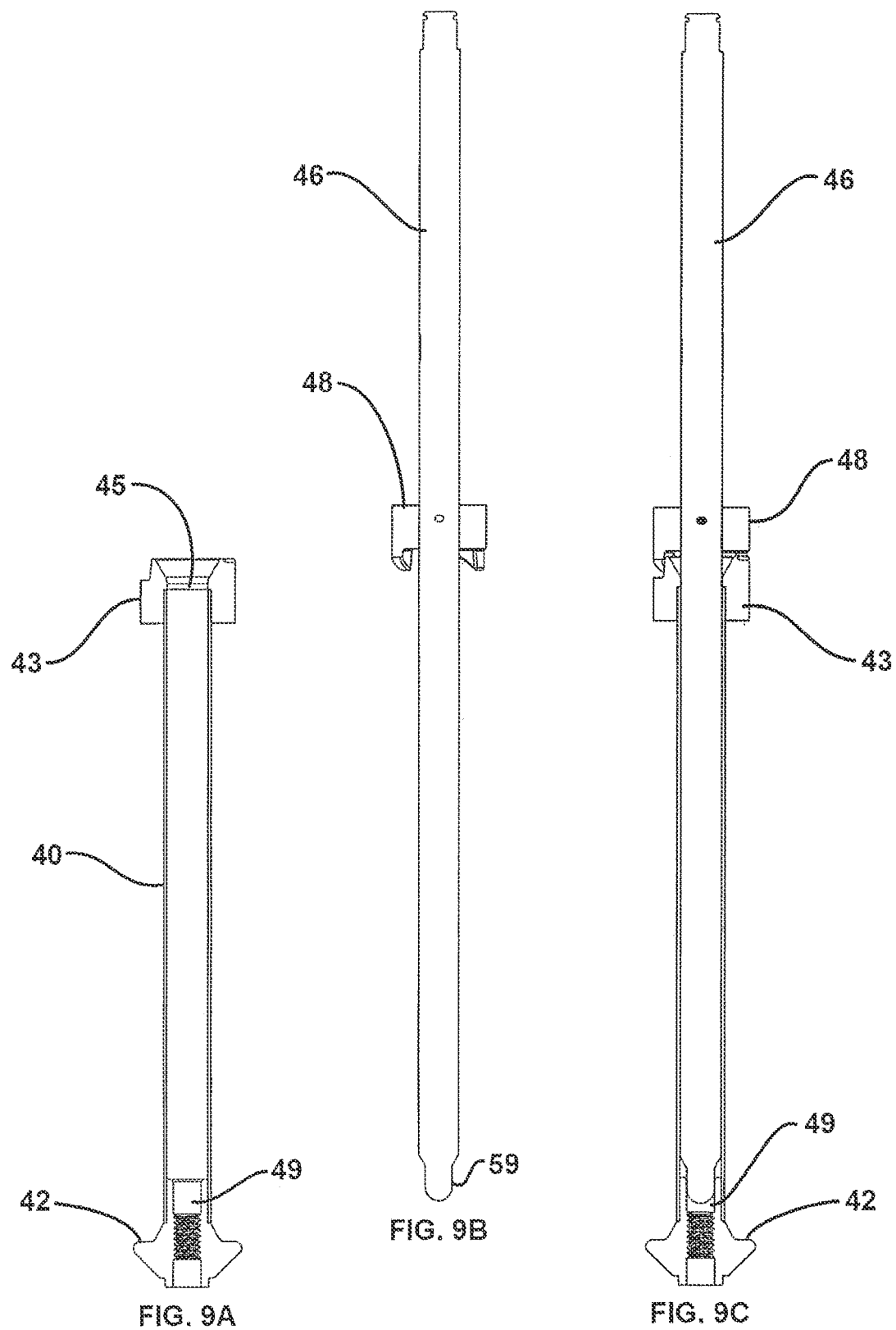

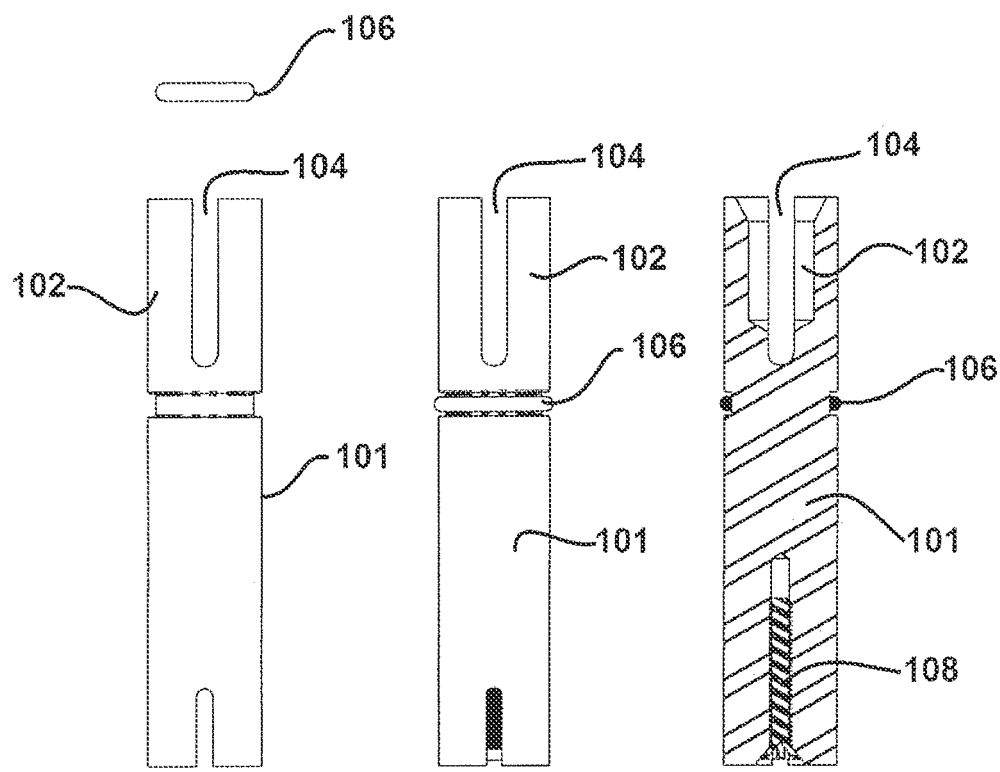

BLENDER WITH REMOVABLE SPINDLE AND MONITORED RESERVOIR

CROSS-REFERENCE TO RELATED APPLICATIONS

This application is a continuation of U.S. patent application Ser. No. 16/393,824, filed Apr. 24, 2019, now U.S. Pat. No. 11,419,458, which is a division of U.S. patent application Ser. No. 15/015,069, filed Feb. 3, 2016, now U.S. Pat. No. 10,299,628, which claims priority to U.S. Provisional Application No. 62/112,116, filed Feb. 4, 2015, the entire contents of all of which are incorporated by reference herein.

FIELD OF THE INVENTION

The present invention relates to food preparation machines, particularly electrical blenders for preparing smoothies, milkshakes, protein shakes and other blended beverages.

BACKGROUND OF THE INVENTION

Blended fruit smoothies, milkshakes and protein shakes are becoming increasingly popular among health conscious people. In these blended drinks, fresh fruits and/or vegetables can be mixed together with, if desired, vitamins and protein supplements to provide fresh nutritious foods in a convenient, portable form.

While it is advantageous to blend carefully selected ingredients at the peak of their freshness, it is often not practical to do so. To have fresh fruits and vegetables available every day, for example, one may need to frequently go shopping for such fruits/vegetables, give the fruits/vegetables time to ripen and then make sure that the fruits/vegetables do not over ripen. Moreover, working with fresh fruits and vegetables usually generates organic wastes, is often messy and inevitably requires clean up. This means a lot of time and attention.

In a fast moving society, there is a demand for a fresh, nutritious blended drink that can be selected and prepared quickly. Better yet, such a fresh, blended drink should be available at a place that can be easily accessed, such as a convenience store, restaurant or one's home.

F'Real Foods, LLC, a subsidiary of Rich Products Corporation, has made a business of making fresh, nutritious smoothies and milkshakes available at easily accessible locations, such as convenience stores. F'Real Foods starts with fresh ingredients, such as fresh fruits and milk, which it pre-blends into smoothies and milkshakes. The pre-blended smoothies and milkshakes are then hard frozen in sealed cups before they are shipped to convenience stores at many different locations. The frozen pre-blended smoothies and milkshakes are then stored in a freezer at the convenience store next to a commercial size blending machine. When the convenience store consumer wants a fresh smoothie or milkshake, the consumer simply selects the desired frozen, pre-blended smoothie or milkshake from the convenience store freezer, tears the seal off the top of the smoothie/milkshake cup and then places the smoothie/milkshake cup in a cupholder built into the blending machine. The consumer can then start the blending machine to blend the frozen smoothie/milkshake to a desired consistency.

F'Real Foods, LLC has numerous U. S. patents and U. S. published patent applications covering its blending machines and processes for preparing smoothies/milkshakes, including U.S. Pat. Nos. 5,803,377; 5,962,060; 6,041,961; 6,326,047; 6,474,862; 6,465,034; 6,527,207; 7,144,150; 7,520,658; 7,520,662; 8,336,731; 8,735,515 and 8,902,626 as well as U. S. Published Patent Application Nos. 2011/0088568; 2013/0341446; 2013/0344220; 2013/0341439 and 2013/0344221.

For its convenience store market, F'Real has built and supplied heavy duty, stainless steel commercial size blenders that can withstand rugged use by convenience store customers while requiring very little maintenance. These heavy duty blenders are typically attached to a municipal water supply so that they have a generous supply of water for blending, cleaning and automatic sanitizing. After a milkshake or smoothie is blended and removed by the customer, the food preparation chamber in the F'Real commercial size blender is sprayed with water, preferably heated water, to wash away any food residue and kill bacteria.

The popularity of F'Real Foods, LLC's convenience store smoothies and milkshakes has led to a demand to make the same sort of smoothies and milkshakes available for use in other settings, such as a home or restaurant. In these other settings, a commercial size blender may be too expensive or dedicated access to a municipal water supply may not be available for the blender. In those instances, it would still be important to prepare the smoothies and milkshakes quickly and in a sanitary manner, but it would need to be done with a simpler machine that could be purchased for a lower price.

BRIEF SUMMARY OF THE INVENTION

The present invention is directed to an economical food or beverage blender that is especially suited for blending frozen milkshakes and smoothies. This blender features a removable, motor driven spindle assembly, a motor driven elevator to lift a cup with the food or beverage to the spindle assembly and a liquid reservoir/pump/heater combination which allows heated liquid to be inserted into the food or beverage during blending. For safety reasons and to protect from damage, the motors, pump and heater are located in a blender housing. A pivotable spindle cover protrudes from the front to the blender housing to prevent the spindle assembly blending tool from injuring the user during the blending process.

The preferred removable spindle assembly has a quick release coupling at its top which attaches onto a spindle support permanently affixed in the blender housing. The spindle assembly can be easily removed for cleaning by turning the quick release coupler and then pulling the spindle assembly downward. Below the quick release coupler is a compression spring which also connects to a cup cover. During blending, the compression spring presses the cup cover against the top of the milkshake/smoothie or other frozen beverage cup to minimize any spilled milkshake/smoothie during the blending process. Blending is accomplished through a combination of an inner spindle drive shaft, a concentric outer spindle drive tube, a combination of cogged couplers and a blending tool. In the preferred embodiment, the inner spindle drive shaft is permanently connected to the spindle motor through a combination of pulleys and a spindle drive belt. To operate the blending tool attached to the outer spindle drive tube, the inner spindle drive shaft is concentrically inserted into the outer spindle drive tube and connected together through cogged couplers. By meshing these cogged couplers, the inner spindle drive shaft and outer spindle drive tube spin together when the spindle motor is activated. An important advantage of this spindle assembly design is that it allows all the spindle assembly surfaces that can come in contact with food to be removed and washed when the removable portion of the spindle assembly is disconnected from the blender.

In the preferred embodiment, a liquid reservoir is connected to the blender housing. A pump and heater are connected to the reservoir to deposit pre-determined amounts of heated liquid from the reservoir into the frozen milkshake or smoothie during blending. Detaching a cap at the top of the reservoir allows the reservoir to be refilled. A fluid level sensor is provided to determine when the fluid level in the reservoir is running low. The fluid level sensor may be, for example, a float, optical, ultrasound, radio wave, capacitive or inductive sensor. In some embodiments, the reservoir is detachable and can be removed for cleaning. In other embodiments, the reservoir is cleaned in place with, for example, a brush.

To operate the blender of the present invention, one begins by moving the pivotable spindle cover upward and attaching a clean spindle assembly to the spindle support using the quick release coupling. The pivotable spindle cover is then pulled down to protect the user during the blending process. A frozen milkshake or smoothie is inserted into the blender cupholder and the start button on the blender is pushed. The blending process begins when the motorized elevator raises the cupholder to the point where the frozen milkshake or smoothie comes into contact with the spindle assembly blending tool. To minimize spills, the spindle assembly automatically presses the cup cover onto the top of the cup before and during blending. The motorized elevator continues to move the frozen milkshake or smoothie up and down during blending until the milkshake or smoothie is blended to the desired consistency. Fluid from the reservoir is added during the blending process to facilitate blending and improve consistency. When blending is complete, the motorized elevator lowers the cup and cupholder to the starting position so that the user can enjoy the fully blended milkshake, smoothie or other frozen blended beverage.

BRIEF DESCRIPTION OF THE DRAWINGS

FIGS. 8A-8F shows close-up views of the outer spindle drive tube, inner spindle drive shaft and cogged couplers;

FIG. 9A-9C shows cross-sectional views of the outer spindle drive tube, inner spindle drive shaft and cogged couplers of FIGS. 8A-8F;

FIG. 10A-10H show an alternative spindle embodiment, including an alternative outer spindle drive tube with a socket fitting;

DETAILED DESCRIPTION OF THE INVENTION

Figure 1:
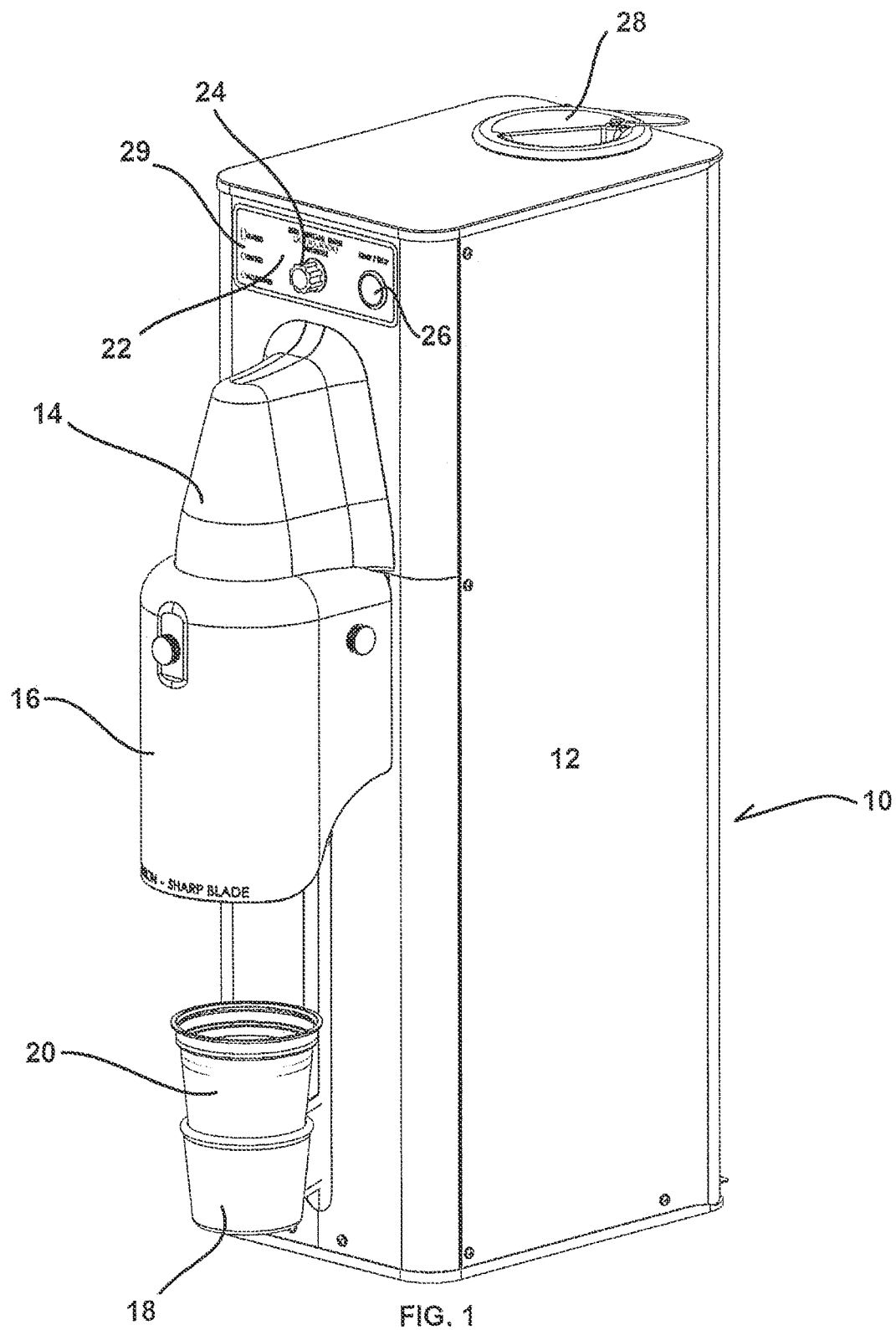
FIG. 1 shows a perspective view of a preferred blender of the present invention.
Figure 2:
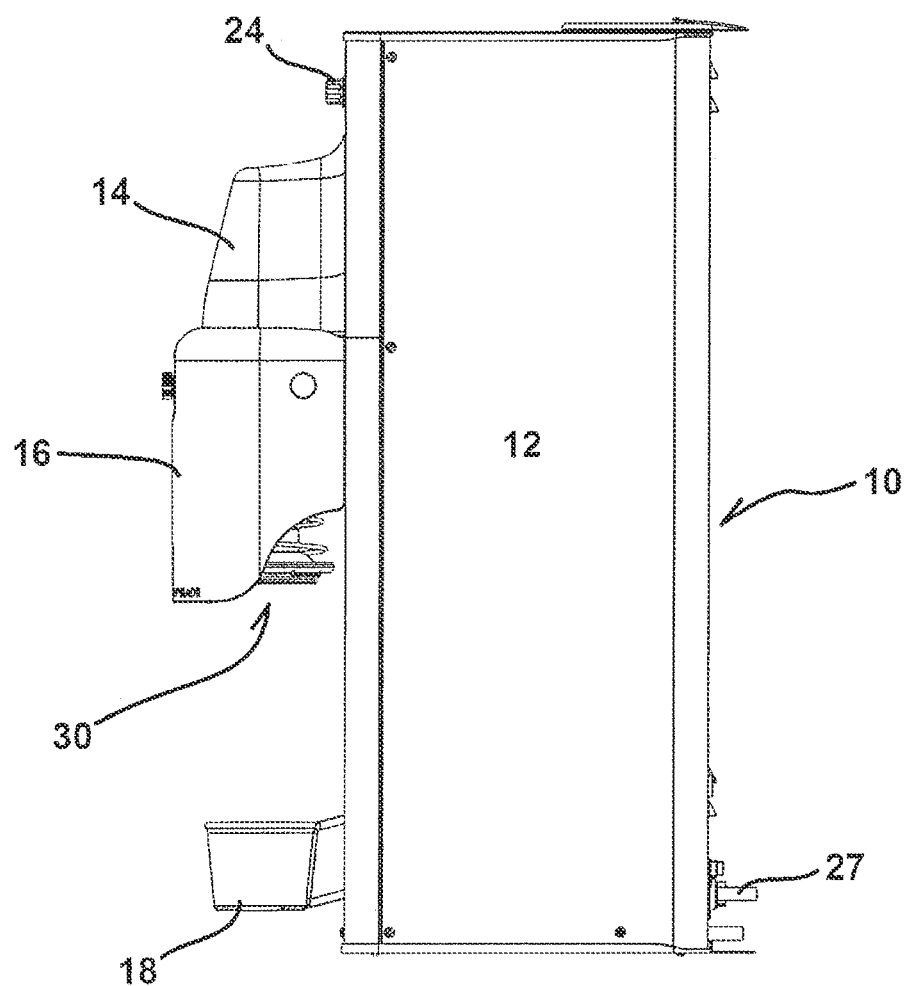
FIG. 2 shows a side view of the blender of FIG. 1 without the cup.

FIGS. 1 and 2 illustrate a preferred blender of the present invention as it would be viewed from the outside. This blender has a housing 12 (to protect its internal working components), an upper spindle cover 14, a pivotable lower spindle cover 16, a cupholder 18, a control panel 22 and a reservoir cap 28. The upper spindle cover 14 and pivotable lower spindle cover 16 accommodate a removable spindle assembly 30 (FIG. 2) which performs the blending. The cupholder 18 is used to hold a cup 20 containing the food or beverage to be blended. In one preferred embodiment, the food or beverage to be blended is a frozen milkshake or smoothie. The reservoir cap 28 covers a built-in fluid reservoir 60 (FIG. 3A-B) at the back of the blender. For blending frozen food or beverages, it is often advantageous to add fluid, such as heated water, during the blending process to facilitate blending and achieve a desired consistency. In the preferred blender of the present invention, the fluid is stored in the fluid reservoir 60. By removing the reservoir cap 28, one can refill the built-in fluid reservoir 60.

A control panel 22 near the top of the blender housing 12 provides the switches 24, 26 and indicator lights 29 that allow operation of the blender. For example, a blending knob 24 allows the operator to set a desired consistency for the blended food or beverage ranging from a thick consistency to a thin consistency. A start button 26 allows the operator to begin the blending process. In the preferred embodiment, pushing the start button 26 will only activate the blender 10 when the blender 10 is ready for operation. Determining whether the blender 10 is ready for operation will preferably depend on such factors as whether the pivotable lower spindle cover 16 is in a lowered position and whether the cupholder 18 is in its base starting position (as illustrated in FIG. 1). Indicator lights 29 can be used to tell the operator if there is a problem that must be corrected before the blender 10 can be operated. For example, an indicator light 29 can remind the operator to lower the pivotable lower spindle cover 16 for the operator's protection before the blender 10 is started. The various functions of the control panel are managed by an appropriate microprocessor (not shown).

Figure 3A:
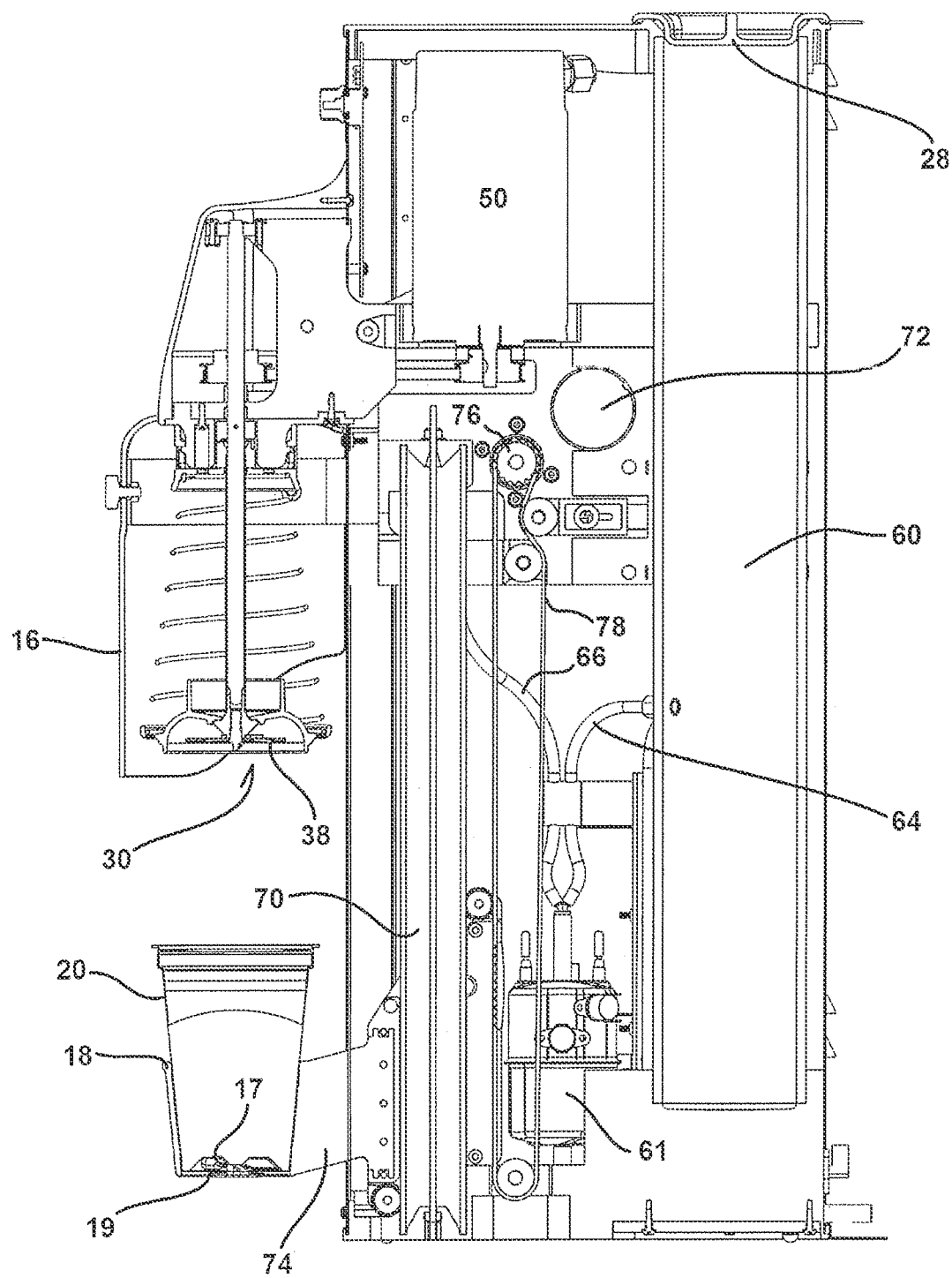
FIGS. 3A-3B show cut away side views of the FIG. 1 blender.
Figure 3B:
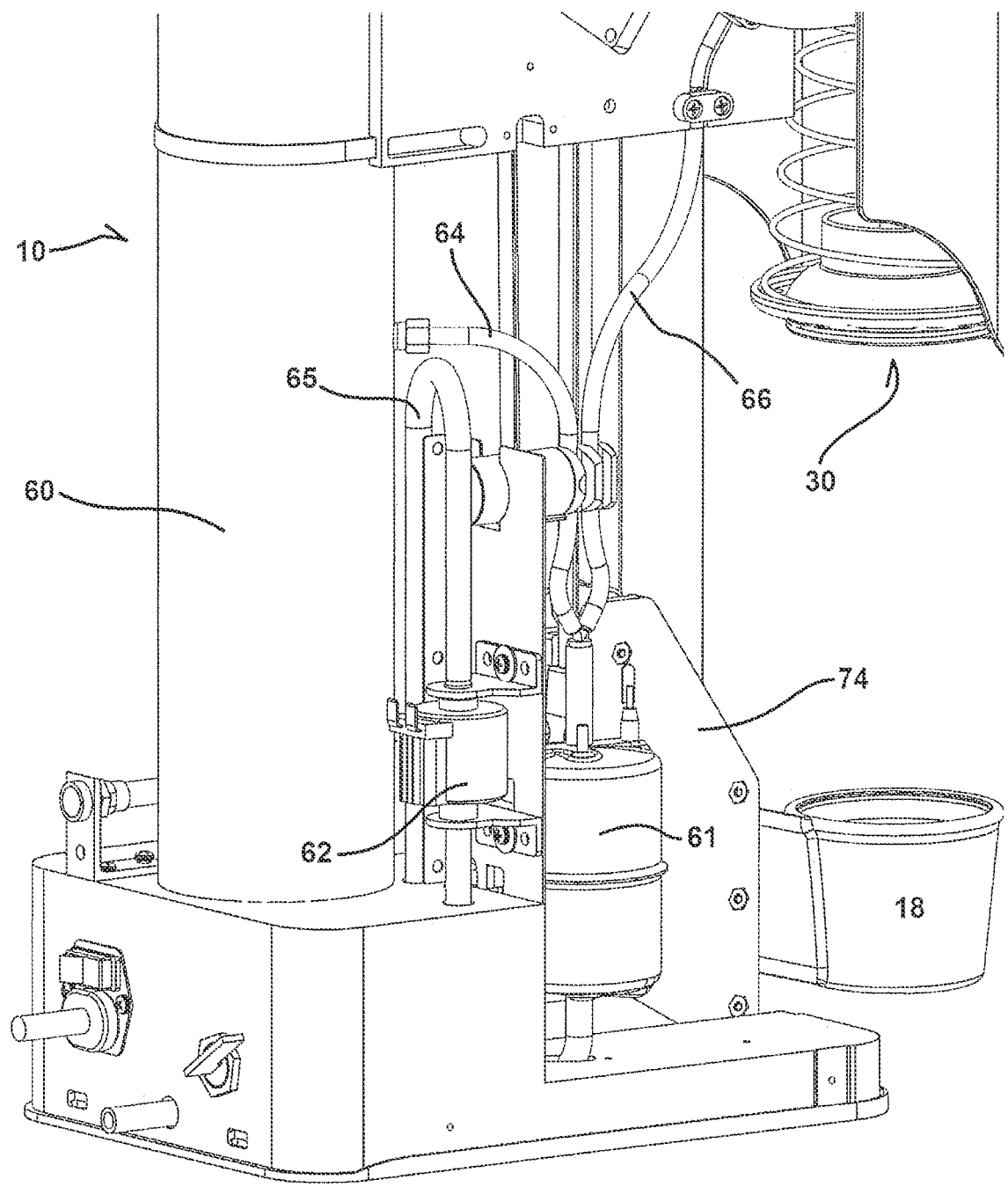

FIGS. 3A and 3B provide cut-away views of the blender 10 of the present invention illustrating its internal working components. These components include a removable spindle assembly 30, a spindle motor 50, a fluid reservoir 60, a fluid heater 61, a fluid pump 62, fluid tubes 64, 65, 66, a cupholder elevator 70, a cupholder carriage 74, an elevator drive gear 76 and an elevator drive belt 78. The removable spindle assembly 30 is used to blend the food or beverage in the cup 20. Through a combination of pulleys 52, 54 and a belt 56 (FIG. 4), the spindle motor 50 spins the blending tool 38 of the removable spindle assembly 30. To place the blending tool 38 in contact with the food or beverage, an elevator 70 is used to raise and lower the cupholder carriage 74 and cupholder 18. The elevator 70 is powered by an elevator motor 72 through elevator drive gear 76 and elevator drive belt 78. The fluid reservoir 60 contains fluid which aids in the blending process. A fluid pump 62 and fluid tubes 65, 66 are used to transfer fluid from the fluid reservoir 60 to the cup 20 during the blending process. In an alternative embodiment, fluid from the reservoir 60 can also be used for spray cleaning of the spindle assembly 30 after use.

The cup 20 and cupholder 18 preferably have mating anti-rotational surfaces 17, 19 to prevent the cup 20 and cupholder 18 from rotating with respect to one another during the blending process. Preferred anti-rotational surfaces 17, 19 are described in f real's U.S. Pat. Nos. 8,336,731 and 6,041,961, the disclosures of which are hereby incorporated by reference.

Figure 4:
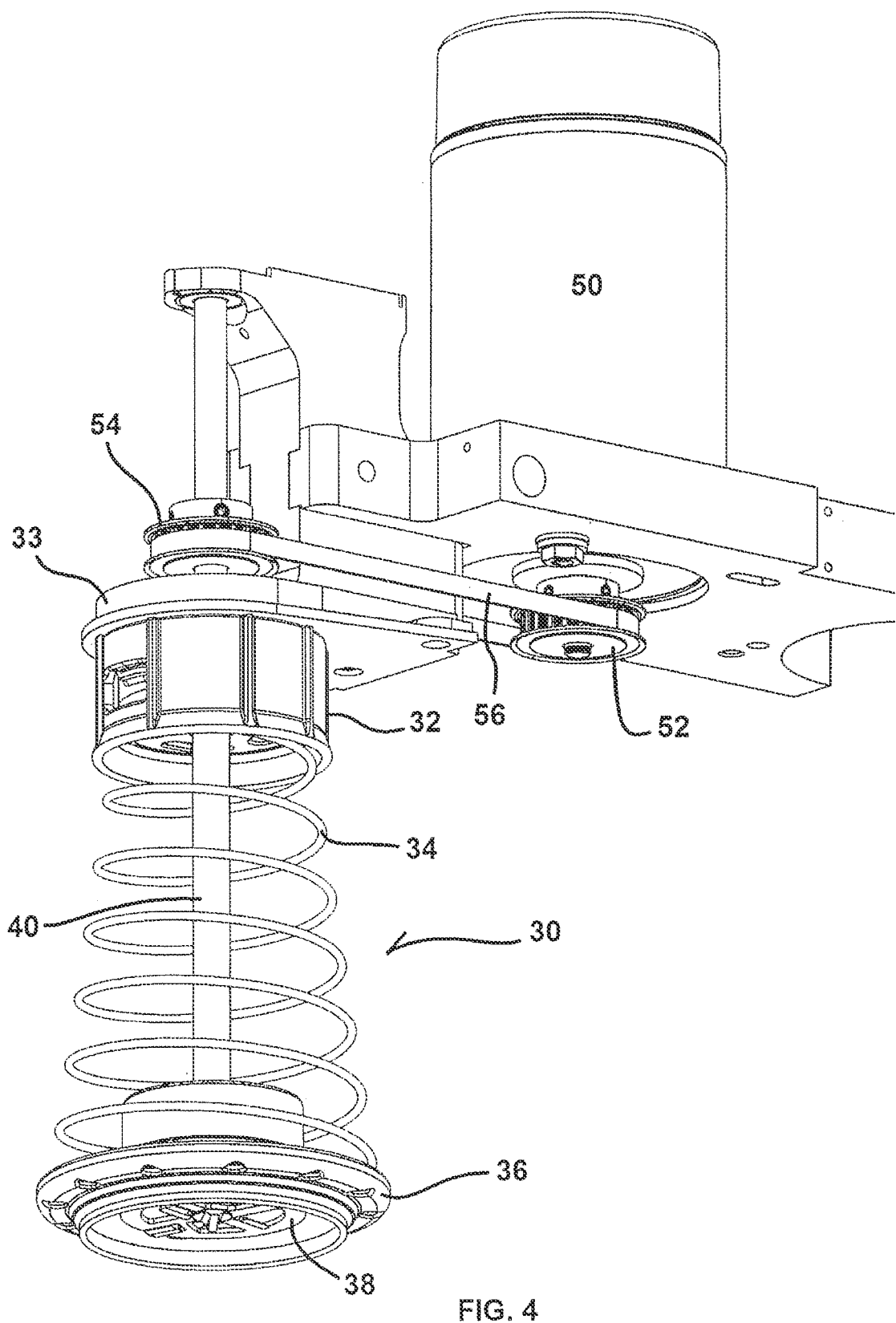
FIG. 4 shows a close-up, perspective view of the preferred spindle assembly connected to the spindle motor.

FIG. 4 illustrates how the removable spindle assembly 30 is operatively connected to the spindle motor 50. The removable spindle assembly 30 is attached to the blender's spindle support 33 through quick release coupler 32. After attachment, the spindle motor 50 rotates the spindle assembly blending tool 38 by spinning the spindle motor pulley 52 and spindle assembly pulley 54 through connector belt 56.

Figure 5:
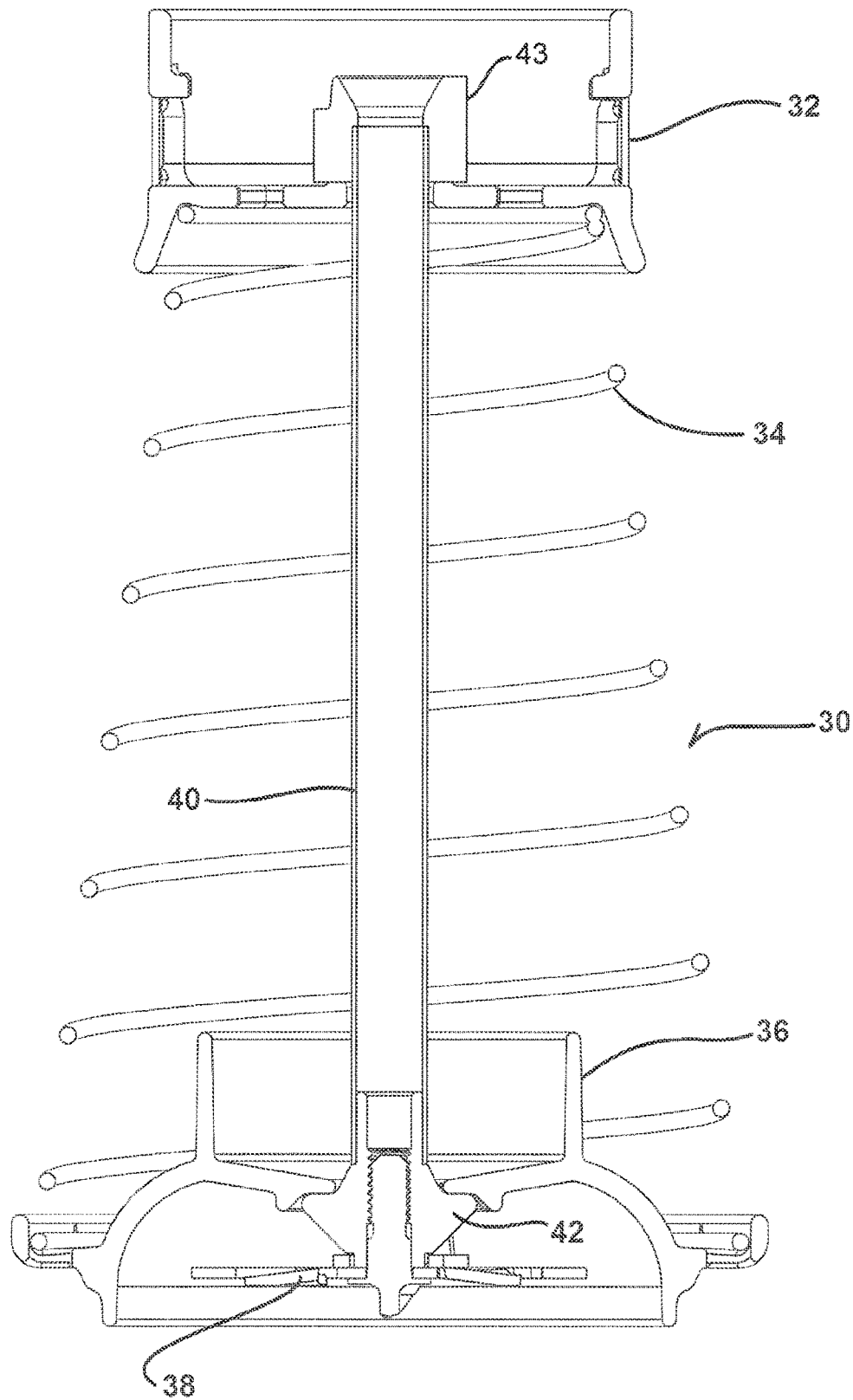
FIG. 5 shows a close-up, cross-sectional view of the spindle assembly.
Figure 6:
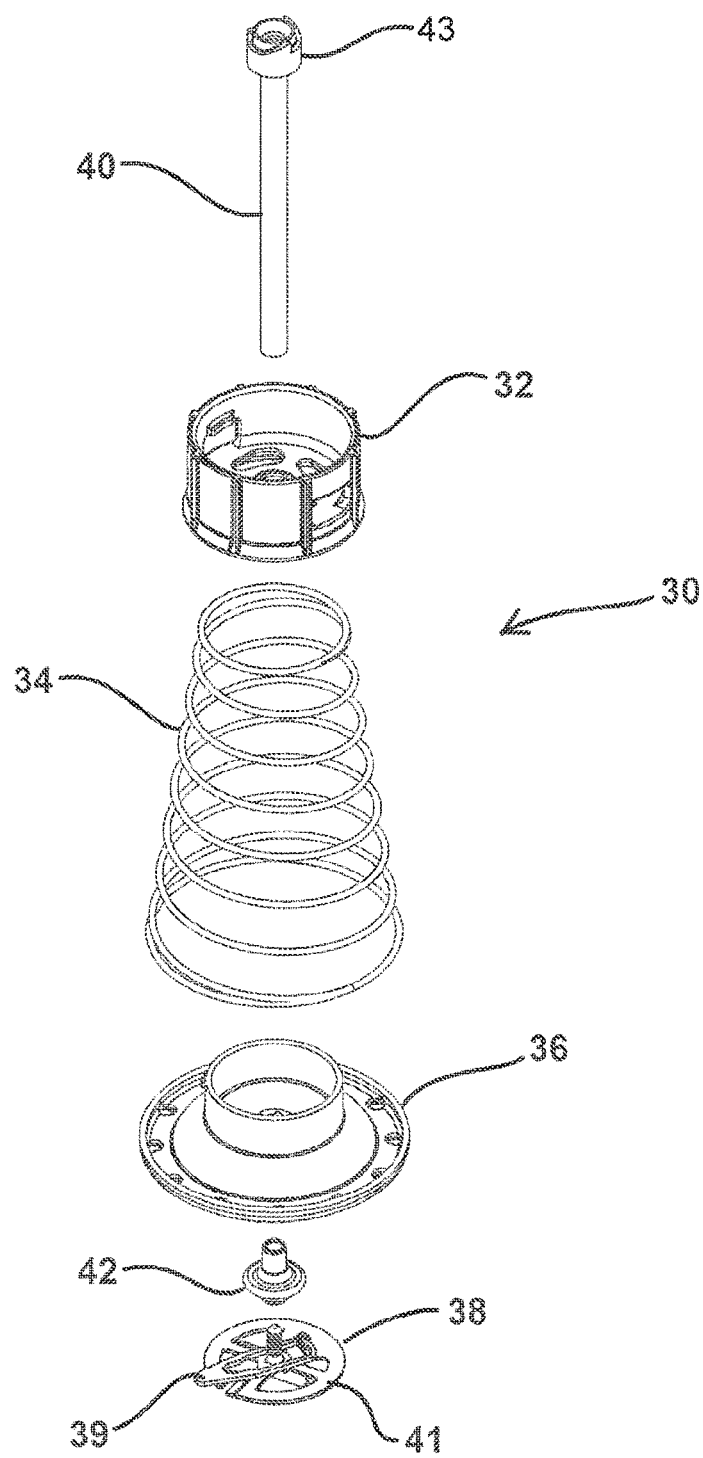
FIG. 6 shows an exploded view of the FIG. 5 spindle assembly.
Figure 7:
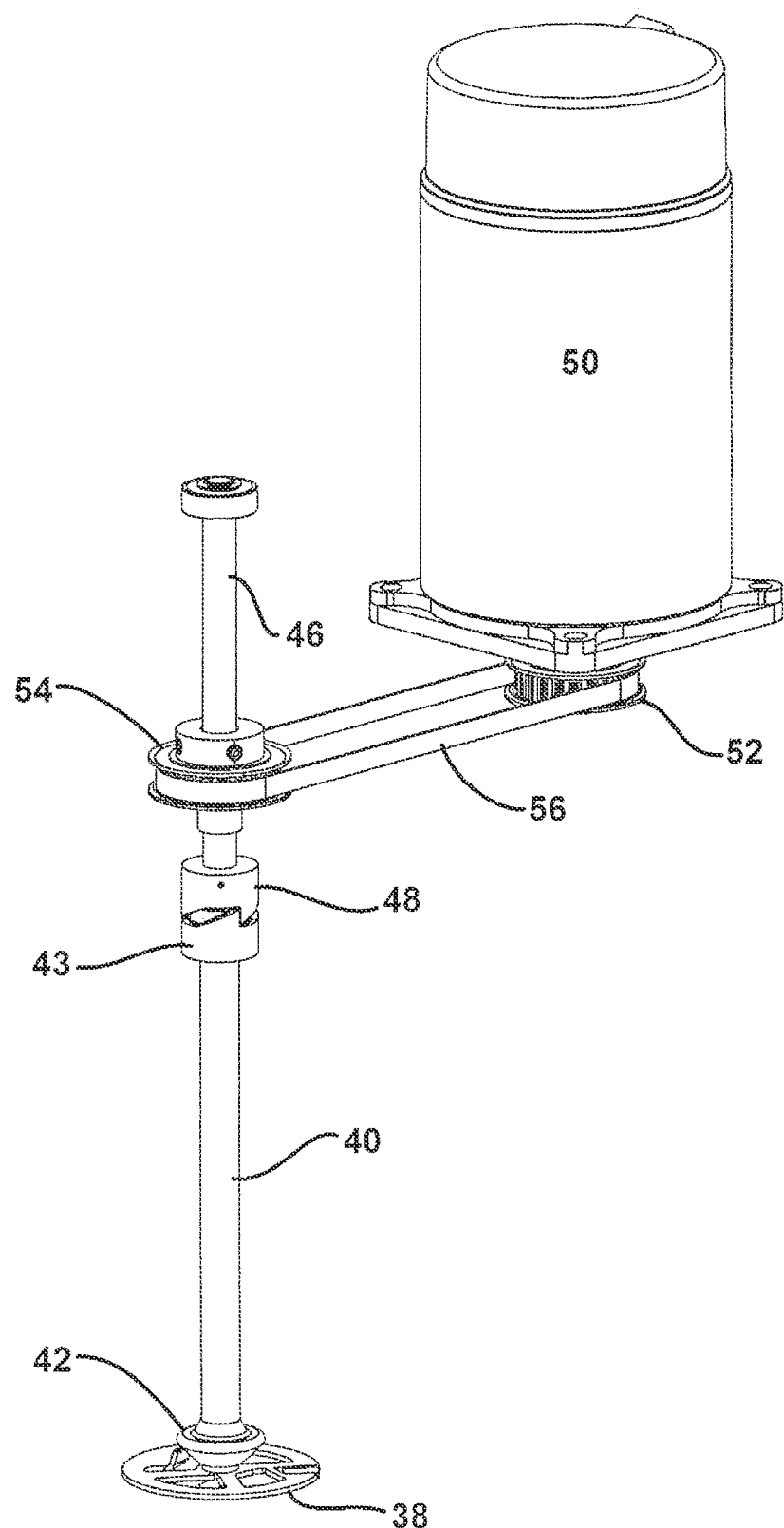
FIG. 7 shows a close-up, perspective view of the outer spindle drive tube and inner spindle drive shaft in the context of the spindle assembly and spindle motor.
Figure 8D:
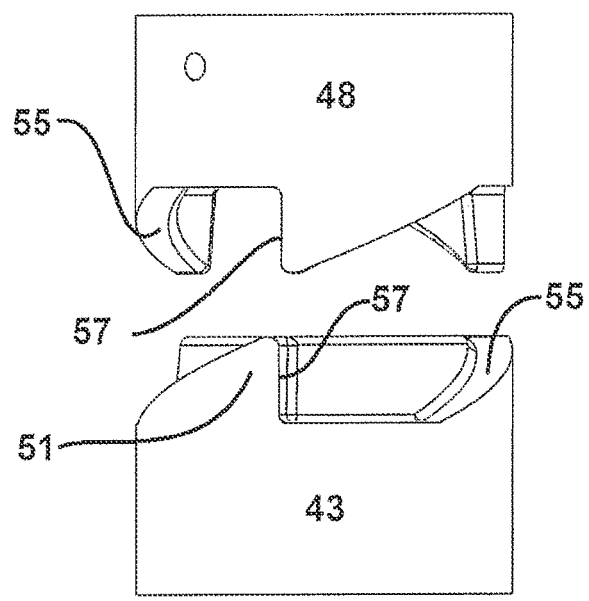
Figure 8E:
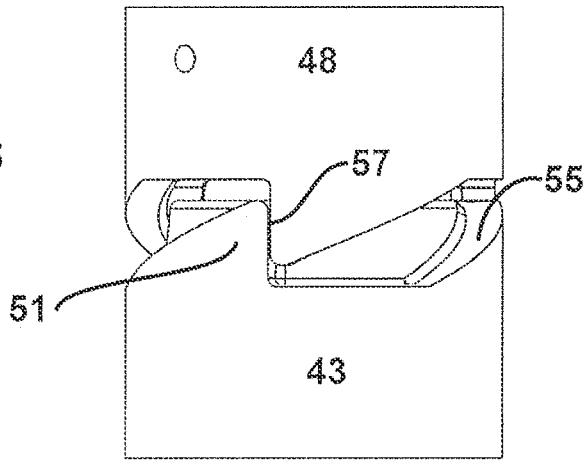
Figure 8F:
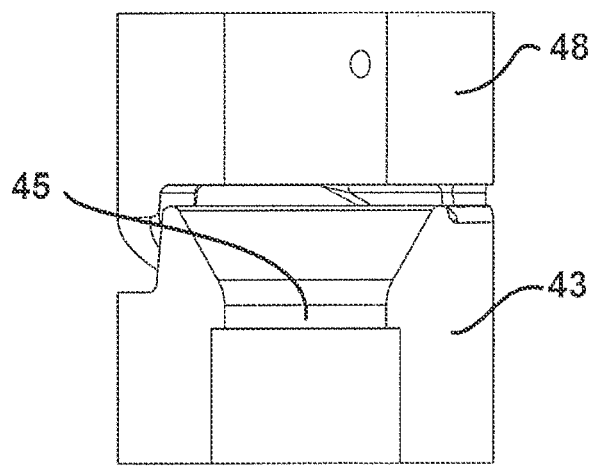
Figure 10A:
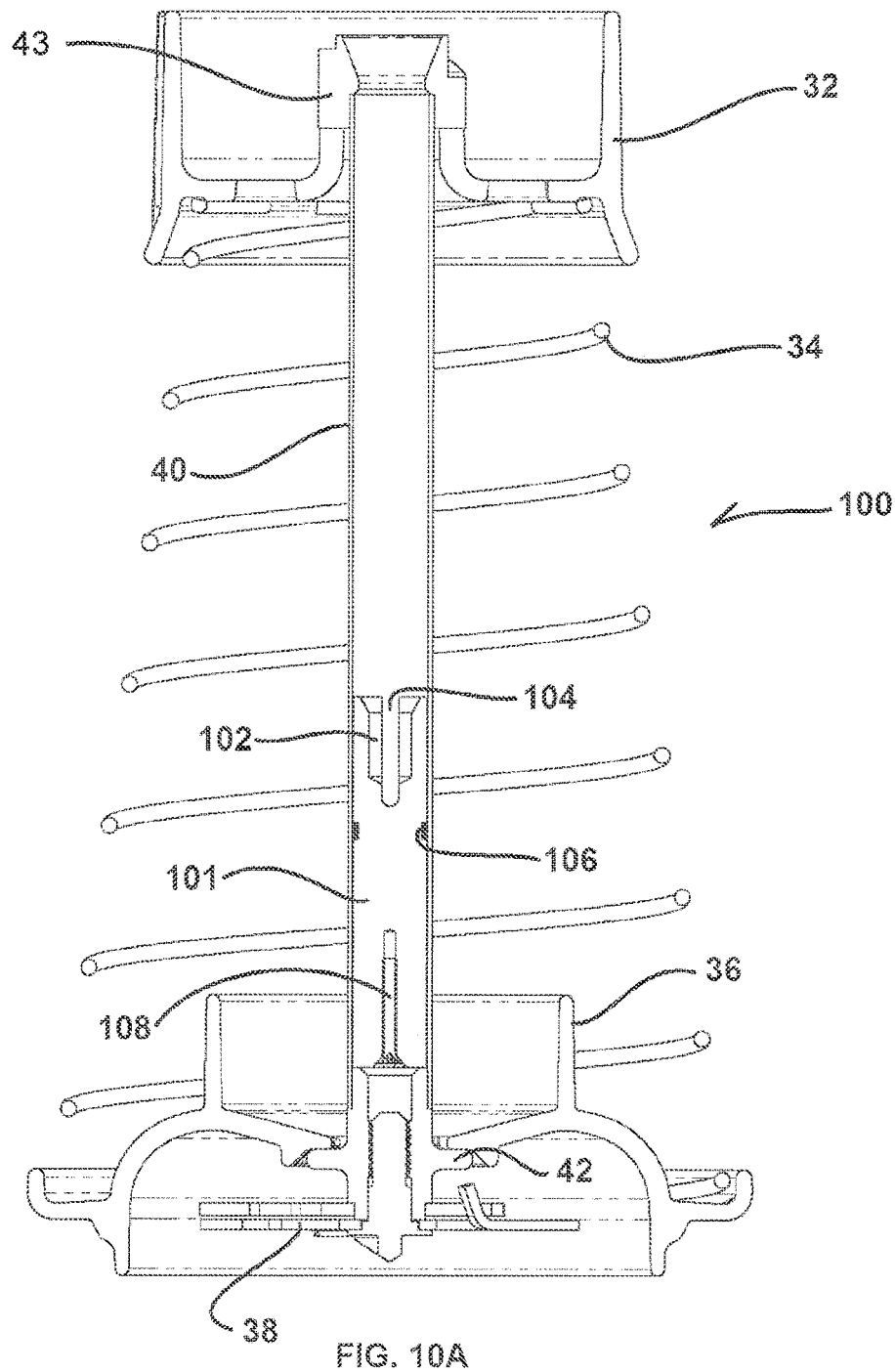
Figure 10B:
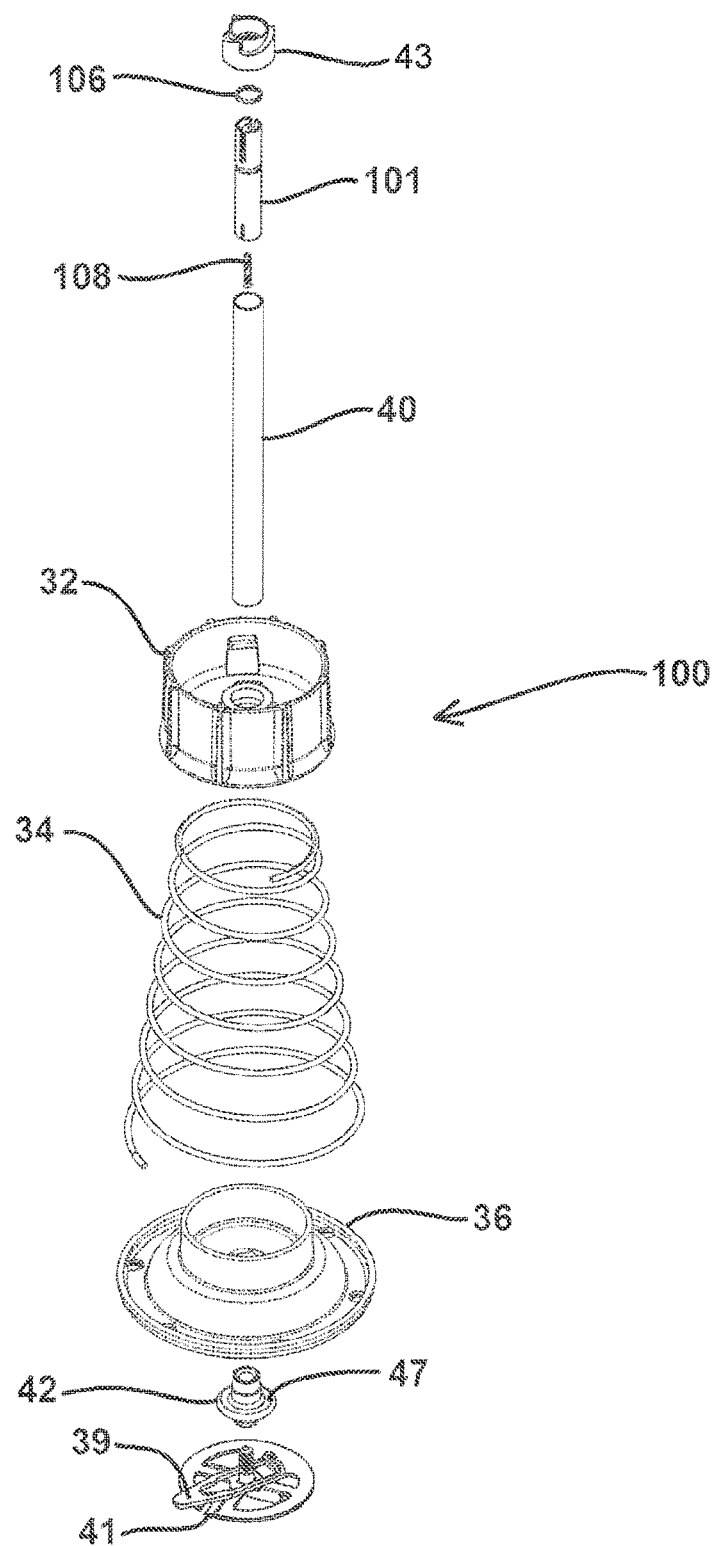
Figure 10C:
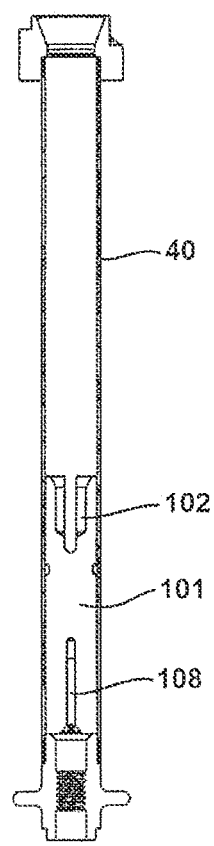
Figure 10D:
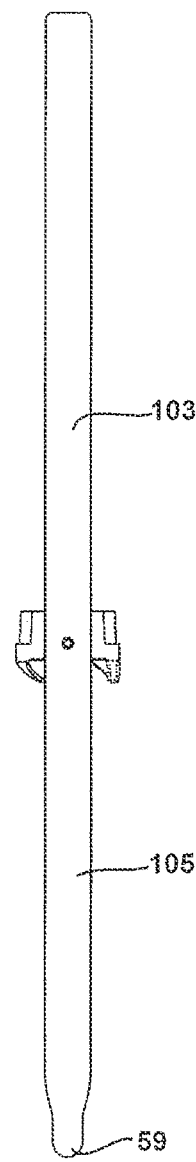
Figure 10E:
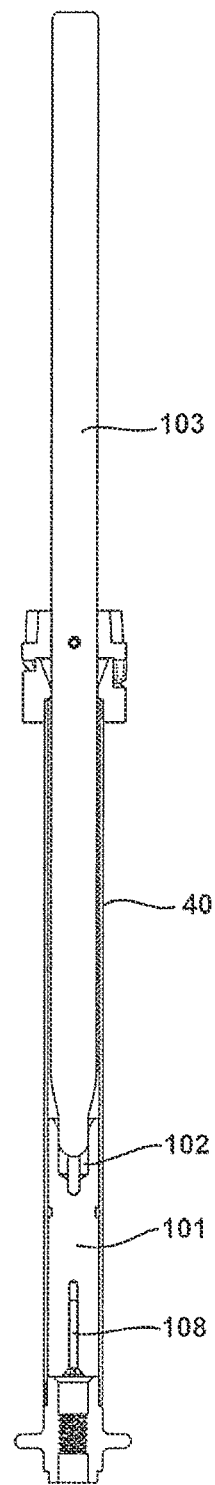

FIGS. 5-6 illustrates the component parts of a preferred removable spindle assembly embodiment 30. At the top of the spindle assembly 30 is a quick release coupler 32 to attach the spindle assembly 30 to the blender 10. At the base of the spindle assembly 30 are the cup cover 36 and blending tool 38. In between the quick release coupler 32 and blending tool 38 is the outer spindle drive tube 40 and a compression spring 34. A cup cover support 42 at the bottom of the outer spindle drive tube 40 is used to prevent the cup cover 36 from dropping off the spindle assembly 30 and a cogged coupler 44 at top of the outer spindle drive tube 40 is used to prevent the quick release coupler 32 from popping off the top of the spindle assembly 30. The cup cover support 42 preferably has an upper planar surface 47 upon which the cup cover 36 rests so that the cup cover 36 will be maintained on the same horizontal plane as the top of the cup 20 (FIGS. 6 and 10B). To create a permanent, heavy duty attachment which prevents food particles from seeping inside the outer spindle drive tube 40, the outer spindle drive tube 40, cup cover support 42 and cogged coupler 44 are all preferably made from stainless steel with both the cup cover support 42 and cogged coupler 44 being welded to the outer spindle drive tube 40. In this preferred embodiment, the compression spring 34 and blending tool 38 are also made of stainless steel. By comparison, the quick release coupler 32 and cup cover 36 can be made from a durable plastic. Alternatively, the cup cover 36 may be made from a combination of a hard plastic base and a soft plastic or rubber seal. In this alternative embodiment, the hard plastic base maintains a resilient shape for the cup.

In this preferred embodiment, the blending tool 38 includes both radially extendable cutting blades 39 and internal cutting blades 41 (FIG. 6). The blending tool 38 is preferably designed both to cut through the food or beverage and to aerate the food or beverage. One preferred blending tool embodiment, which includes one or more radially extendable cutting blades 39 and internal cutting blades 41, is disclosed in U.S. Pat. No. 6,527,207, the disclosure of which is hereby incorporated by reference. The purpose of the radially extendable cutting blades 39 is to compliment the internal cutting blades 41 by adjusting to sections of the cup 20 with different radiuses. For example, most cups are not perfectly cylindrical, but rather have a larger inner radius at their top than at their bottom. The cup 20 illustrated in FIG. 1 is such a tapered cup. By having one or more radially extendable cutting blades 39 complimenting the internal cutting blades 41, the radially extendable cutting blades 39 can extend their blending radius to the edge of the cup 20 even though that radius changes from the top of the cup to the bottom of the cup. While a combination of internal cutting blades 41 and radially extendable cutting blades 39 is the preferred blending tool 38 for the present invention, particularly where the food or beverage to be blended is frozen, those of skill in the art will recognize that other blending tools, such as whisks, may also be used in appropriate circumstances.

FIGS. 7 through 9C illustrate how the inner spindle drive shaft 46 works in cooperation with the concentric outer spindle drive tube 40 to transfer rotational energy from the spindle motor 50 to the blending tool 38. Like the spindle motor 50 and pulleys 52, 54, the inner spindle drive shaft 46 is permanently attached to the blender 10. As the spindle assembly pulley 54 turns, the inner spindle drive shaft 46, which is permanently attached to that pulley 54, turns with it. The challenge confronting the inventors was how to transfer the rotational motion of the inner spindle drive shaft 46 to the removable spindle assembly blending tool 38. The inventors solved this problem by permanently attaching the blending tool 38 to an outer spindle drive tube 40. While this outer spindle drive tube 40 is circular in cross-section in the preferred embodiment, those of skill in the art will recognize that the outer spindle drive tube 40 can also have alternative cross-sectional shapes, such as square, hexagonal, octagonal etc. When the removable spindle assembly 30 is attached to the blender 10, the tip 59 of the inner spindle drive shaft 46 slides concentrically into the hollow central opening 45 of the cogged coupler 43 until the cogged coupler 43 of the outer spindle drive tube 40 meshes with the cogged coupler 48 of the inner spindle drive shaft 46 (see, FIG. 8D-F and FIG. 9C). To facilitate the meshing of the respective cogged couplers 43, 48, mating teeth 51 are provided on both sets of cogged couplers 43, 48. These teeth 51 have ramped edges 55 and walled edges 57. As illustrated in FIGS. 8D-F, when the cogged couplers 43, 48 come in contact with one another, the ramped teeth edges 55 bias the teeth 51 into a firm engagement (see, FIG. 8E). This biasing is made possible because, until the cogged couplers 43, 48 lock together, the spindle assembly 30 and inner spindle drive shaft 46 are able to turn independently of one another. Once the teeth 51 are locked into this firm engagement, the rotation of the inner spindle drive shaft 46 is efficiently translated into rotation of the outer spindle drive shaft 40 and, with it, the blending tool 38. In other words, when the teeth 51 are locked into firm engagement, the inner spindle drive shaft 46 and outer spindle drive tube 40 rotate in unison.

The use of concentric drive shafts/tubes 40, 46 in the present invention has numerous advantages over prior designs. Since the outer spindle drive tube 40 insulates the inner spindle drive shaft 46 from contact with food during the blending process, there is no need to repeatedly clean the inner spindle drive shaft 46. This is important because the preferred inner spindle drive shaft 46 is permanently attached to the blender 10 and, thus, cannot be easily transported to a sink and washed. By comparison, since the outer spindle drive tube 40 is part of the removable spindle assembly 30, it can be cleaned when the removable spindle assembly 30 is detached from the blender 10 for cleaning. As illustrated in FIGS. 11-14, the use of concentric drive shafts/tubes 40, 46 also has a further advantage when the permanently attached inner spindle drive shaft 46 acts as a guide during the process of reattaching the removable spindle assembly 30 to the blender 10. Once the free end 59 of the inner spindle drive shaft 46 is placed in the top of the cogged coupler 43 and outer spindle drive tube 40, reattaching the removable spindle assembly 30 to the blender 10 then becomes largely a matter of sliding the outer spindle drive tube 40 up the inner spindle drive shaft 46. Also, the cogged couplers 43, 48 are designed to allow the inner spindle drive shaft 46 to be firmly engaged to the outer spindle drive tube 40 during the blending process but then easily separated when the spindle assembly 30 is removed from the blender 10 for cleaning. A further advantage of the drive shaft/tube 46, 40 arrangement of the present invention is that, by securing the inner drive shaft 46 at the two separated ends of the outer drive shaft 40 (i. e., at the cogged coupler 43 and cup cover support 42; see, FIG. 9C), wobble or "run out" in the operation of the spindle assembly 30 is minimized as compared with a system where this is only a single point of contact. While use of an inner drive shaft 46 which is permanently attached to the blender and an outer spindle drive tube 40 which is part of the removable spindle assembly 30 is the preferred embodiment for the present invention, those of skill in the art will recognize that these parts could be switched and still create a workable blender (i. e., with the outer spindle drive tube permanently attached to the blender and the inner drive shaft being part of the removable spindle assembly).

FIGS. 10A-H illustrate an alternative removable spindle assembly preferred embodiment 100. The alternative preferred embodiment is identical to the earlier spindle assembly preferred embodiment 30, except for the inclusion of socket fitting 101, O-ring 106, screw 108 and an inner spindle drive shaft 103 with a shorter lower end 105. In the earlier preferred embodiment, the tip 59 of the inner spindle drive shaft 46 seated itself in a rigid hole 49 in the cup cover support 42 when the spindle assembly 30 was fully engaged and connected to the blender 10 (see, FIG. 9C). Because of the hole's rigidity, vibration of the inner spindle drive shaft 46 during operation of the spindle assembly 30 may result in fretting wear to the tip 59 of the inner spindle drive shaft 46 which, over time, may create wobble and increased fretting wear. To address the fretting wear issue, the alternative spindle assembly 100 includes a socket fitting 101 with a flexible socket 102. The socket fitting 101 is preferably made from a hard plastic, such as polyethylene or polypropylene. Flexibility is built into the socket 102 by including one or more longitudinal slots 104 in the socket 102. When the tip 59 of the inner spindle drive shaft 103 is inserted into the socket 102, the longitudinal slots 104 allow the socket 102 to expand to create a snug, compliant fit. The socket fitting 101 has the additional benefit of allowing the lower end 105 of the inner spindle drive shaft 103 to be shorter than in the earlier spindle assembly preferred embodiment (see, FIG. 10D). The shorter lower end 105 allows for easier insertion into and removal of the inner spindle drive shaft 103 from the outer spindle drive tube 40.

To assemble the alternative removable spindle assembly 100, the lower end of the outer spindle drive tube 40 is first welded to the top of the cup cover support 42. An O-ring 106 is placed around the periphery of socket fitting 101 and the socket fitting 101 is then slid into the interior annular space of the outer spindle drive tube 40 until its lower end comes to rest on top of the cup cover support 42. A screw 108 is then inserted into the bottom of the socket fitting 101 to expand the socket fitting 101 and lock it in place in much the same way a screw locks a dry wall anchor in place.

Figure 11:
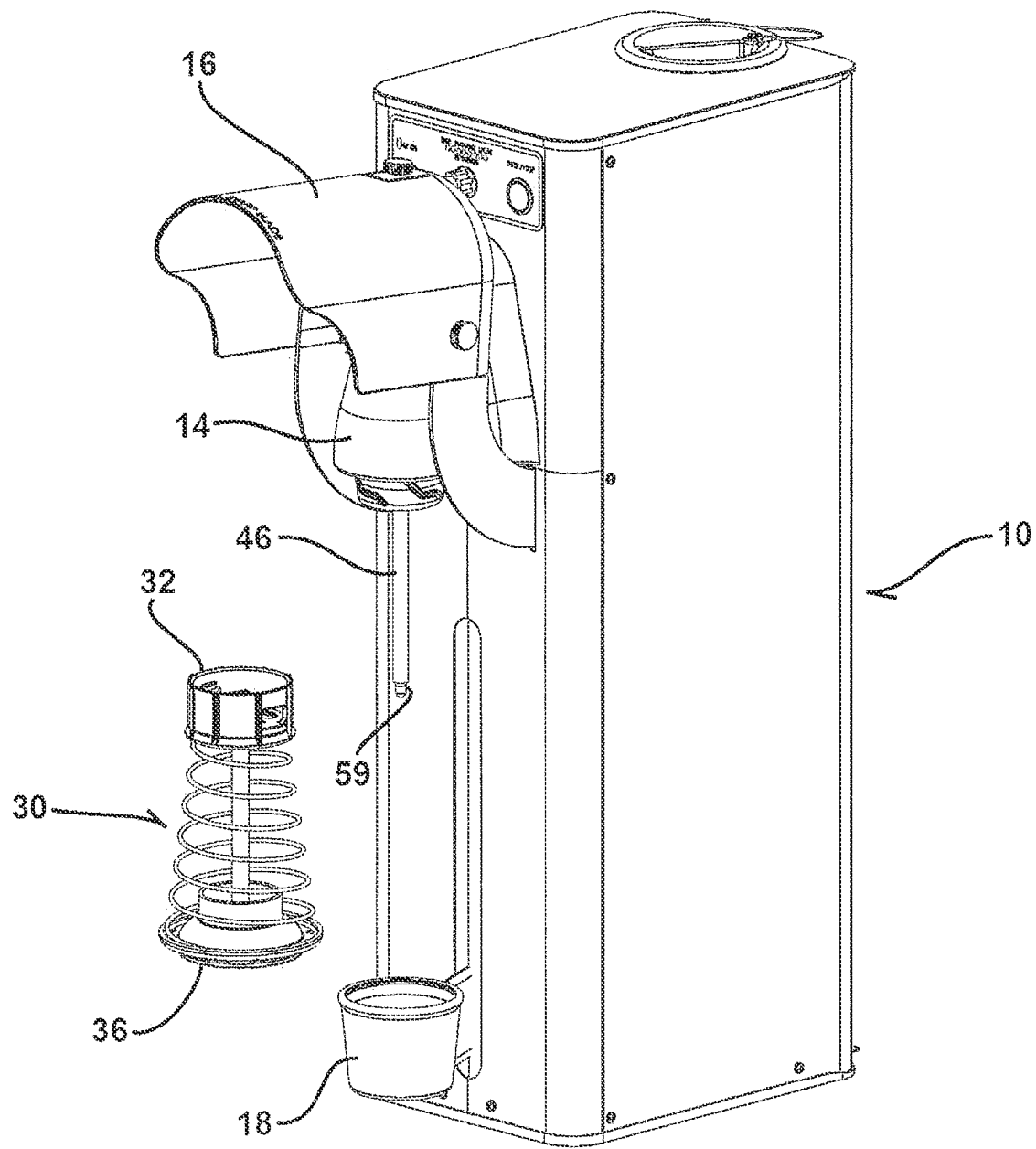
FIG. 11 illustrates the preferred blender of the present invention before the removable spindle assembly is attached.
Figure 12:
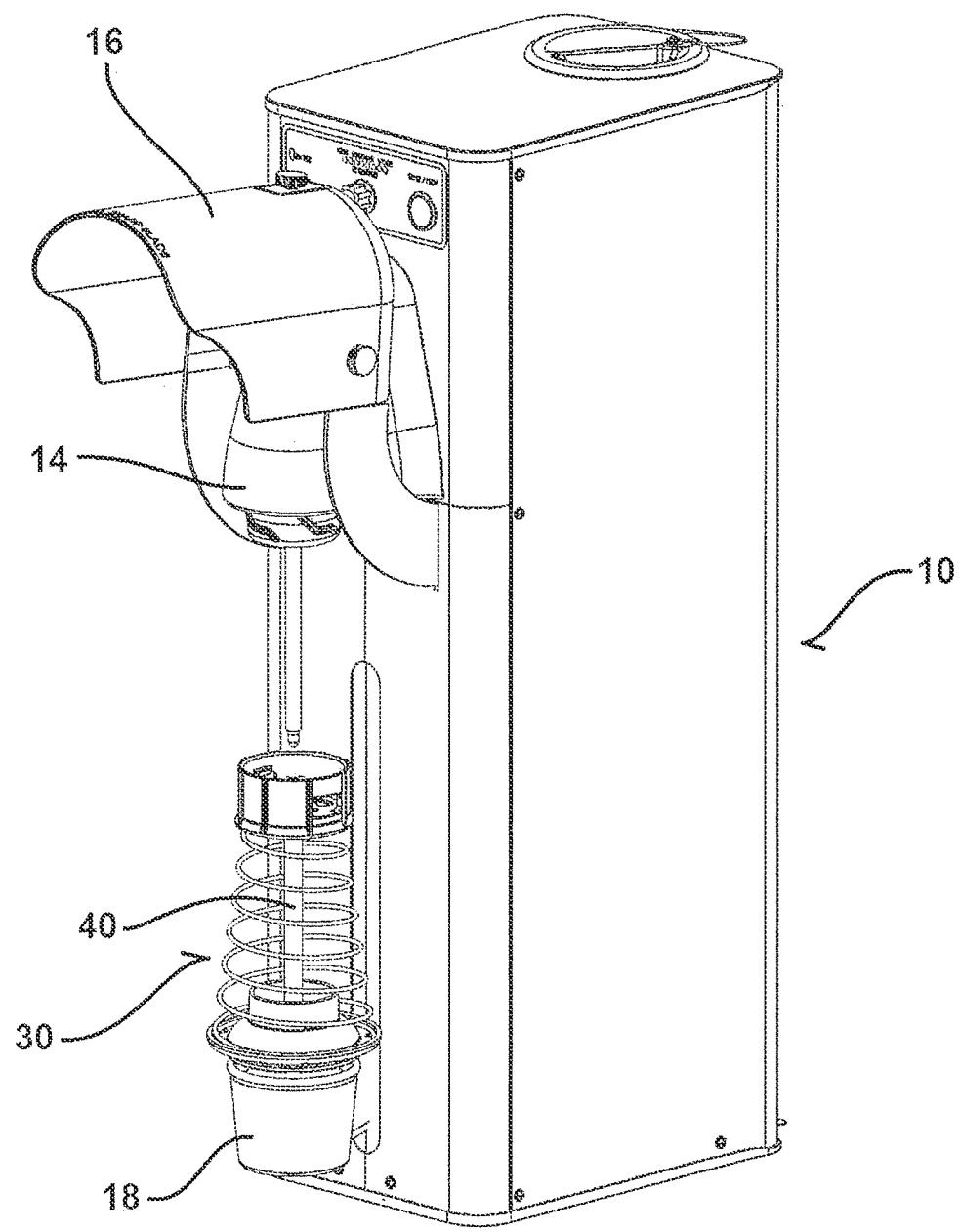
FIG. 12 illustrates how the removable spindle assembly is axially aligned with the inner spindle drive shaft before it is attached.
Figure 13:
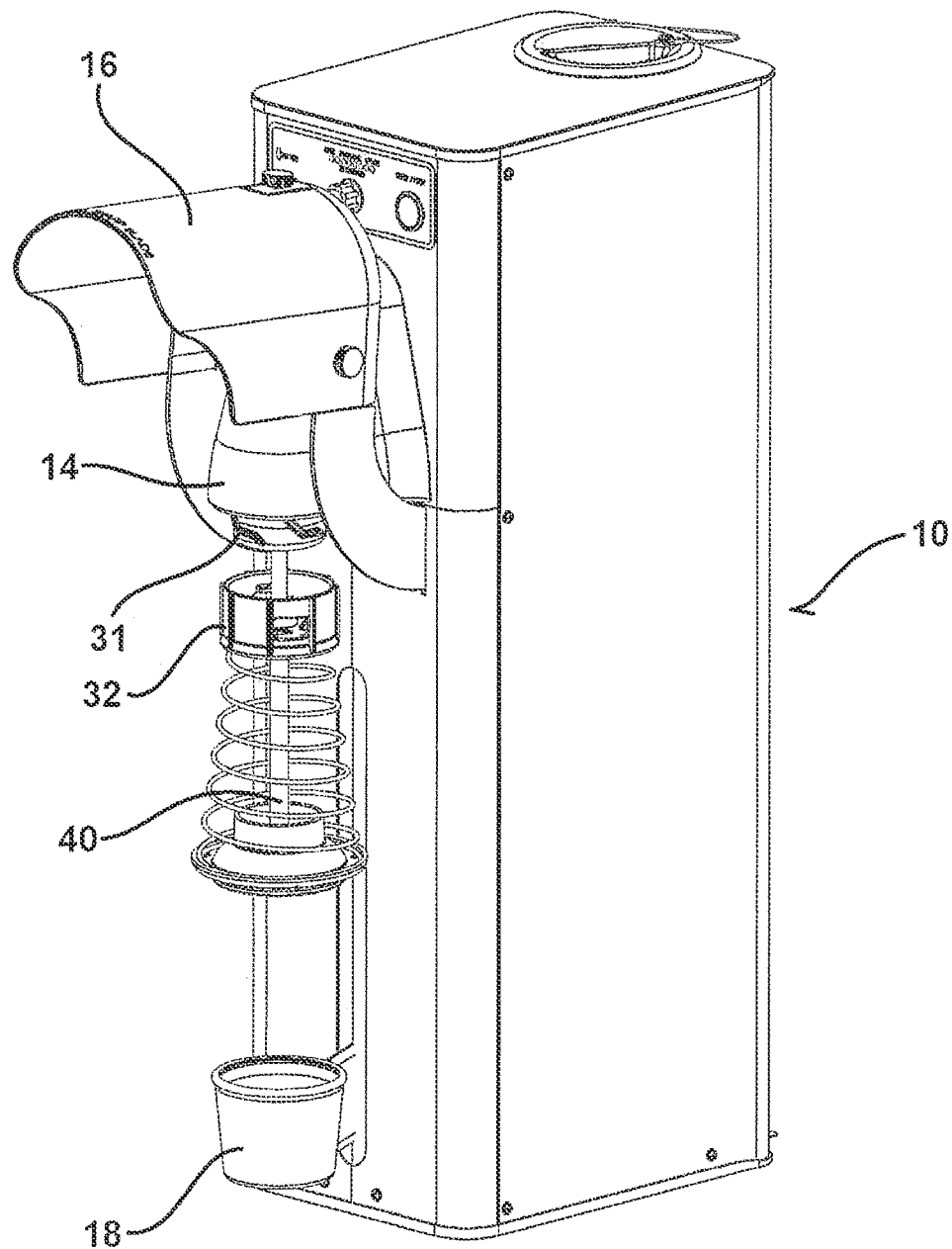
FIG. 13 illustrates how the outer spindle drive tube slides over the inner spindle drive shaft when the removable spindle assembly is attached to the blender.
Figure 14:
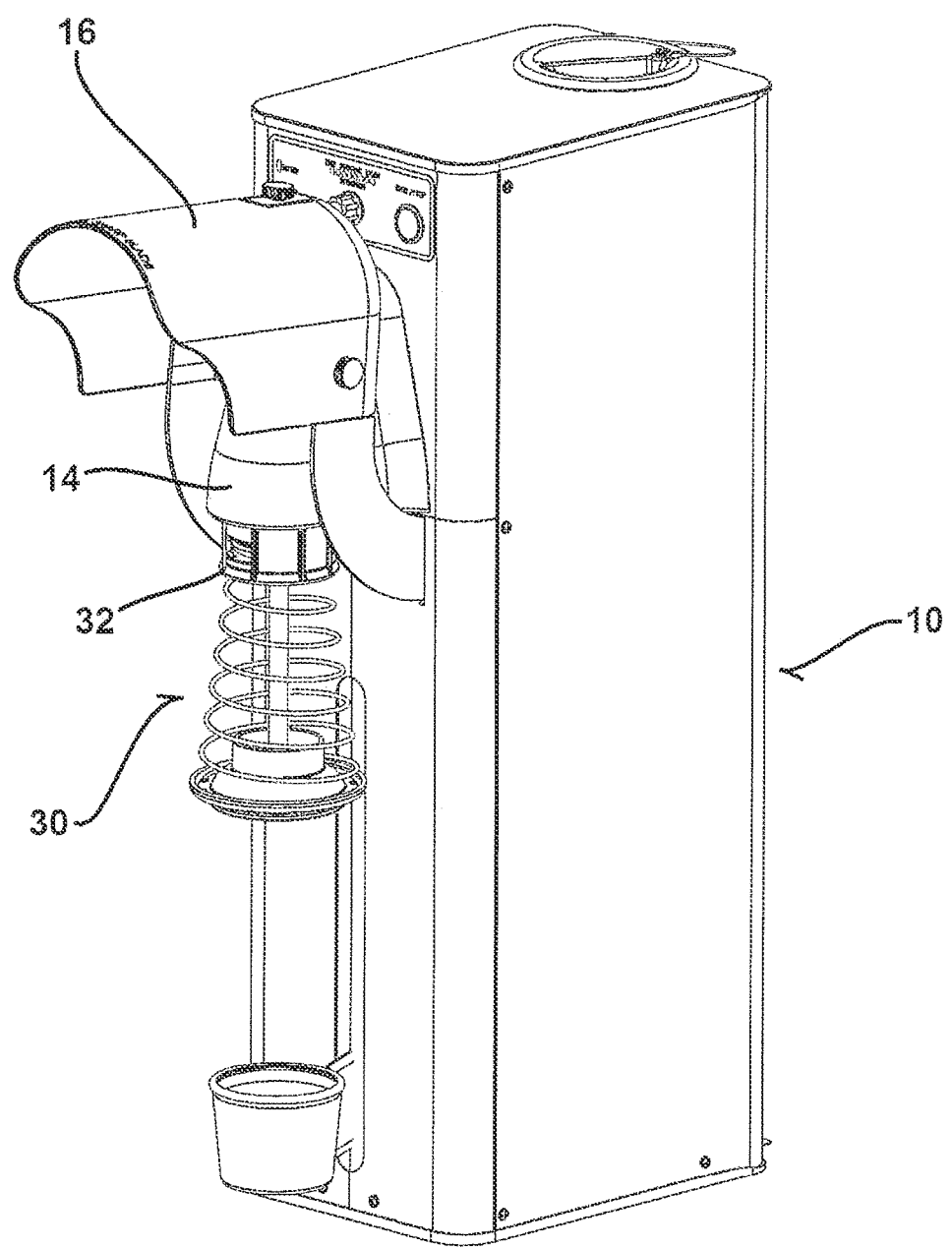
FIG. 14 illustrates how attachment of the removable spindle assembly to the blender is completed through use of the quick release coupling member.

FIGS. 11-14 illustrate the progression of steps for attaching a removable spindle assembly 30 to the blender when it is first installed or after it has been removed and cleaned. To begin the process, the pivotable lower spindle cover 16 should first be tilted upward to allow easier insertion of the removable spindle assembly 30. In some embodiments, this may involve pressing a switch or latch to release the cover 16 from a locked position. Preferably, as soon as the cover 16 is lifted upward, the spindle motor 50 and elevator motor 72 are deactivated from operating. This deactivation can be done by a "kill switch" connected to the cover 16. As shown in FIGS. 11-12, the removable spindle assembly 30 should then be inserted into the front of the blender 10 so that its quick release coupler 32 is below the lower tip 59 of the inner spindle drive shaft 46 and its cup cover 36 is above the top of the cupholder 18. After the removable spindle assembly 30 has been inserted into this space, the lower tip 59 of the inner spindle drive shaft 46 should be aligned so that it can be inserted into the interior opening 45 of the cogged coupler 43. As shown in FIGS. 13-14, once the inner spindle drive shaft 46 is inserted into the interior opening 45 of cogged coupler 43, the removable spindle assembly 30 can slide upward until its quick release coupler 32 comes into contact with the permanently attached spindle support coupling 31.

In the preferred embodiment, once the quick release coupler 32 comes in contact with the spindle support coupler 31, the two couplers can be locked together simply by turning the quick release coupler 32 to the left. Conversely, to unlock the quickly release coupler 32 and disengage the removable spindle assembly 30, one would turn the quick release coupler 32 to the right. While one mechanism for attaching the spindle assembly 30 to the blender has been illustrated, those of skill in the art will recognize that other mechanisms can be used to attach the spindle assembly 30 to the blender 10. For example, in an alternative embodiment, instead of manually turning a quick release coupler 32 with one's hand to attach the spindle assembly 30, one can instead slide a rotatable release lever (not shown) from one side to the other (e. g., from left to right) to engage the quick release coupler 32. In a further alternative embodiment, a button (not shown) can be pressed to lock or unlock the quick release coupler from the spindle support coupling 31. After the removable spindle assembly 30 is properly attached to the blender 10 as illustrated in FIGS. 11-14, the pivotable lower spindle cover 16 should be pivoted downward to its lowered operating position as illustrated in FIG. 1. By being in this lowered position prior to operation, it blocks the user's fingers from inadvertently coming in contact with the rotating blending tool 38 while blending is taking place.

Figure 15:
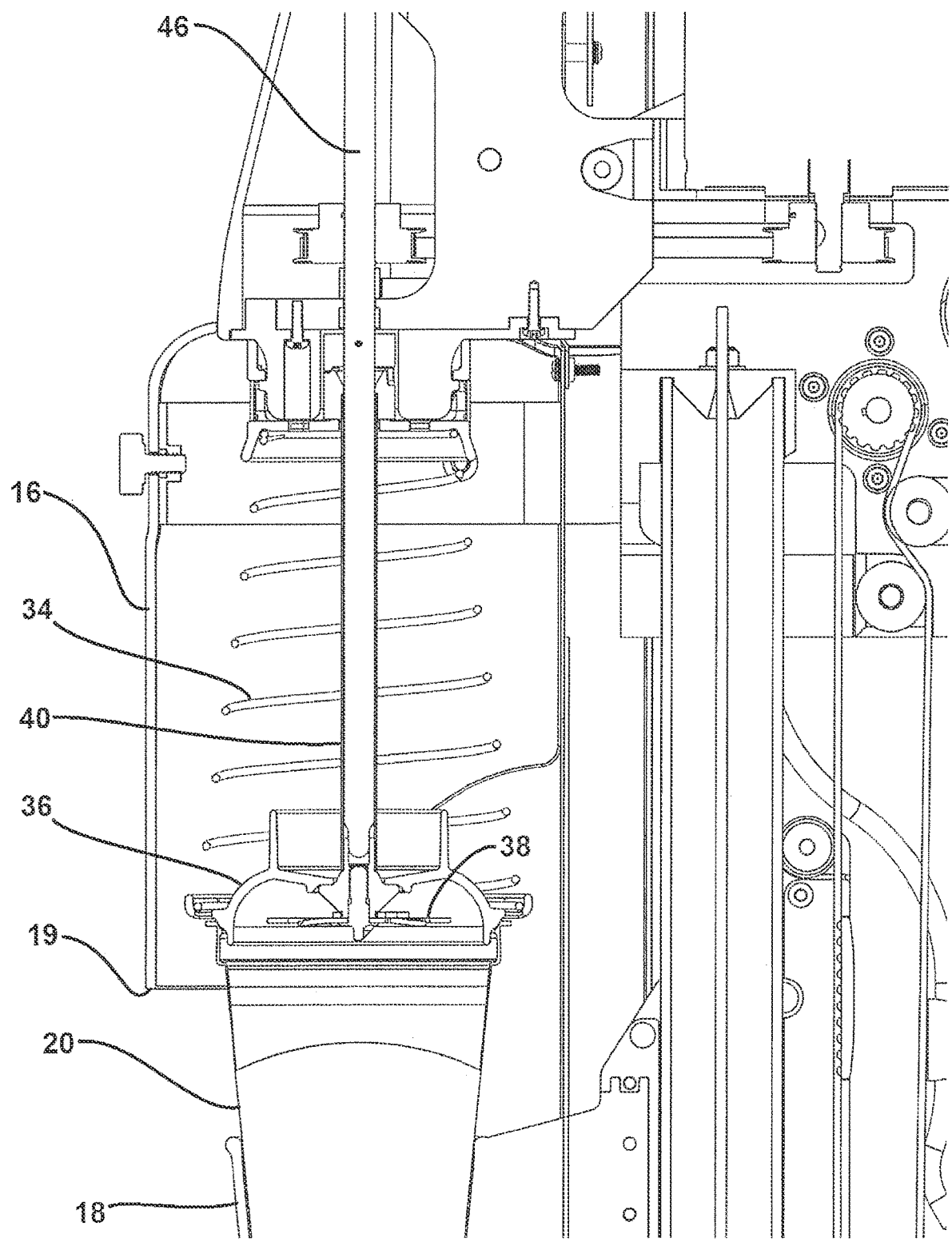
FIG. 15 is a cross-sectional, cut-away view of the blender of the present invention illustrating how the removable spindle assembly cup cover attaches to the top of the cup prior to blending.

FIGS. 1 and 15-17 illustrate how a food or beverage product can be blended once the removable spindle assembly 30 is properly attached to the blender 10. As shown in FIG. 1, the process begins by placing a cup 20 with food or beverage in the cup holder 18. The operator can then turn the blending knob 24 on the control panel 22 to select a desired consistency and press the start button 26 on the control panel 22 to indicate that they are ready for the blending process to start. At that point, a microprocessor (not shown) in the blender will preferably check to see that the machine is ready for blending before activating elevator motor 72 and then spindle motor 50. For example, the microprocessor will confirm that the pivotable lower spindle cover 16 is in a lowered position and that the cupholder 18 is in its bottom starting position as shown in FIG. 1. Once these checks are done, the elevator motor 72 is activated to lift the cupholder 18 and cup 20 upward toward the spindle assembly 30. As shown in FIG. 15, after the top of the cup 20 passes the bottom 19 of the pivotable lower spindle cover 16, the spindle assembly cup cover 36 is pressed onto the top of the cup 20 by compression spring 34. As previously noted, the purpose of the cup cover 36 is to prevent food or beverage from spilling out of the cup 20 during the blending. In addition to preventing spills, use of a compression spring 34 also presses the anti-rotational mechanisms 17,19 (FIG. 3A) into firmer engagement to prevent the cup 20 from spinning during the blending process. In the preferred embodiment, the blending tool 38 on the spindle assembly 30 is not allowed to begin rotating until: (1) the top of the cup 20 passes the bottom 19 of the pivotable lower spindle cover 16; (2) the cup cover 36 is pressed onto the top of the cup 20 and (3) the blending tool 38 comes in contact, or is about to come in contact, with the food or beverage in the cup 20 (see, FIG. 16). Sensors, such as optical sensors or electric current sensing (not shown), can be used to make sure these conditions are met before the microprocessor activates the spindle motor 50.

Figure 16:
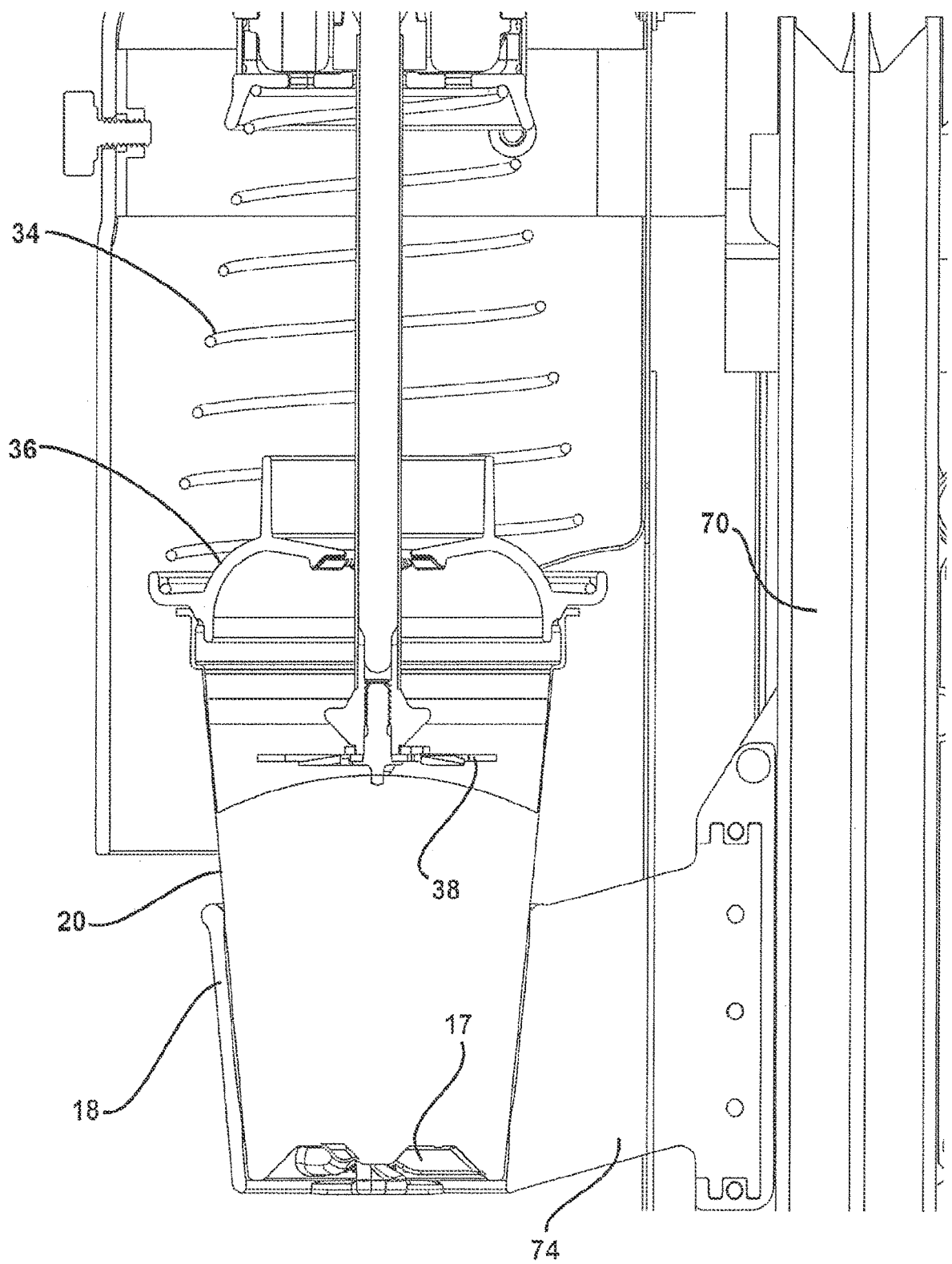
FIG. 16 is a cross-sectional, cut-away view of the blender of the present invention illustrating how the cup is raised into a position to begin blending.
Figure 17:
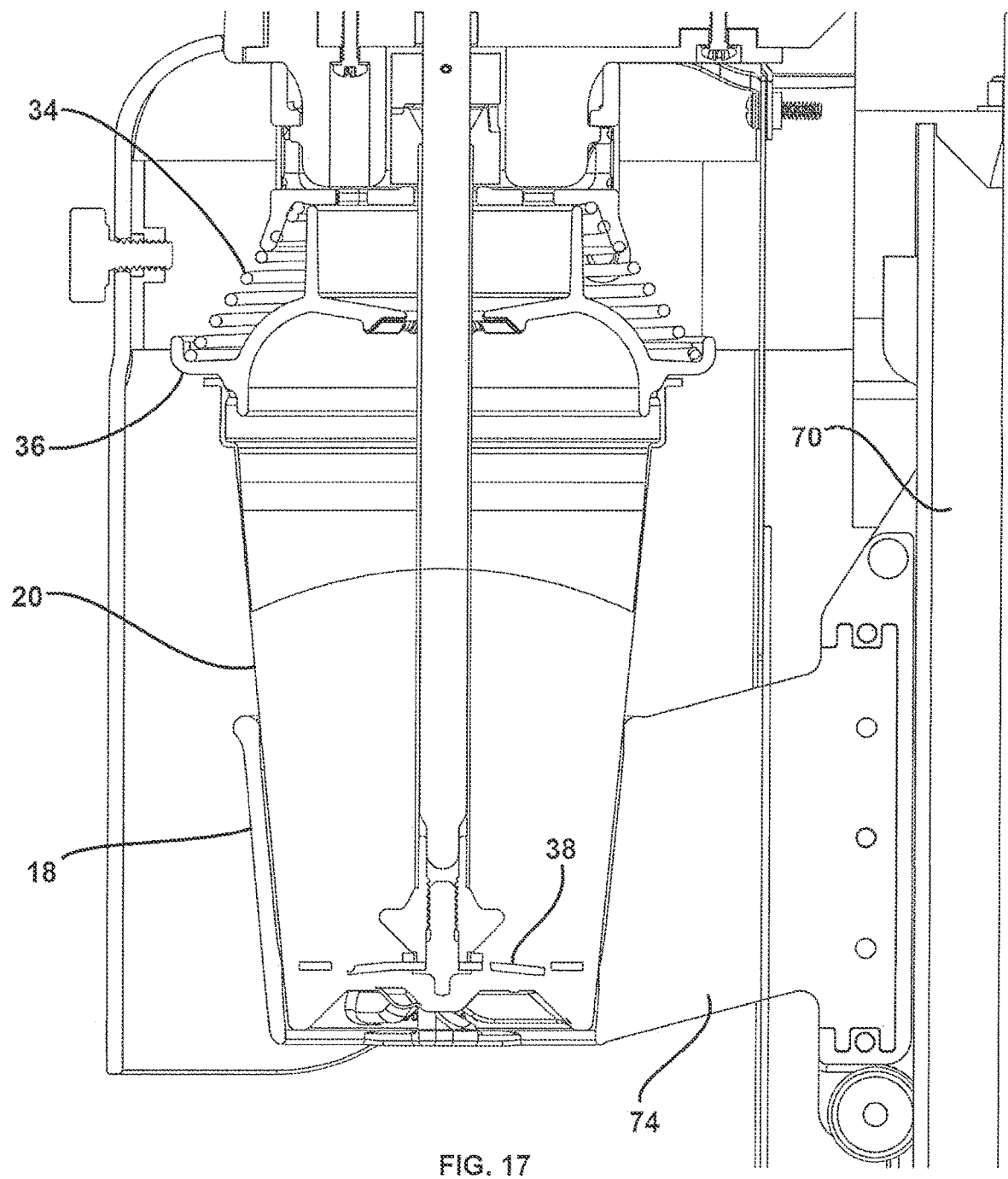
FIG. 17 is a cross-sectional, cut-away view of the blender of the present invention illustrating how the blending tool blends at the bottom of the cup.

FIGS. 16 and 17 illustrate operation of the blending tool 38 to blend food or beverage in the cup 20. In the preferred blender 10, the blending tool 38 remains at a constant, predetermined height while the cupholder 18 moves up and down. As the elevator assembly 70 moves the cupholder 18 up and down, the blending tool 38 operates at different levels of the food or beverage in the cup 20. For example, in the position shown in FIG. 16, the blending tool 38 begins by blending food or beverage at the top of the cup 20. As the elevator 70 continues to raise the cup 20, the blending tool 38 blends food or beverage at progressively lower levels in the cup 20 until the blending tool 38 reaches the bottom of the cup 20 as shown in FIG. 17. To achieve even blending and good consistency, the blending tool 38 should work at all levels of the food or beverage present in the cup 20. When the cupholder 18 is subsequently lowered, the blending tool 38 continues to blend, but this time at progressively higher levels of food or beverage in the cup 20. To get the best blending and consistency, the cupholder 18 is preferably raised and lowered multiple times while the blending tool 38 is spinning. The blending process preferably ends with a "spin-off" after the cup has been partially lowered so that the food or beverage is cleared from the blending tool 38. Once the blending process is completed, the elevator assembly 70 lowers the cupholder 18 and cup 20 to the bottom starting position shown in FIG. 1. The blender operator can then remove the cup 20 from the cupholder 18 so that the user can enjoy their fully blended food or beverage. While it is preferred in the present invention that the cup/cupholder move up and down during the blending process while the blending tool is stationary, the present invention can alternatively be carried out with the blending tool moving up and down while the cup/cupholder are stationary. This alternative embodiment would allow a cup/cupholder carousel to be used to speed up preparation of multiple milkshakes/smoothies.

After each cup of food or beverage is blended, the blending tool 38 should be rinsed to remove any food or beverage that has not already been spun off the blending tool 38. Preferably, the spindle assembly 30 is removed from the blender and rinsed either at a faucet or in a container of water (similar to cleaning ice cream scoops). The spindle assembly 30, or a backup spindle assembly which has already been rinsed, cleaned and/or sanitized, is then attached to the blender 10 before preparing a subsequent cup of food or beverage. Periodically, the spindle assembly 30 should be removed for a more thorough cleaning of all its parts. In a preferred embodiment, the spindle assembly 30 is removed for full cleaning and sanitizing at least once every four hours.

Figure 18:
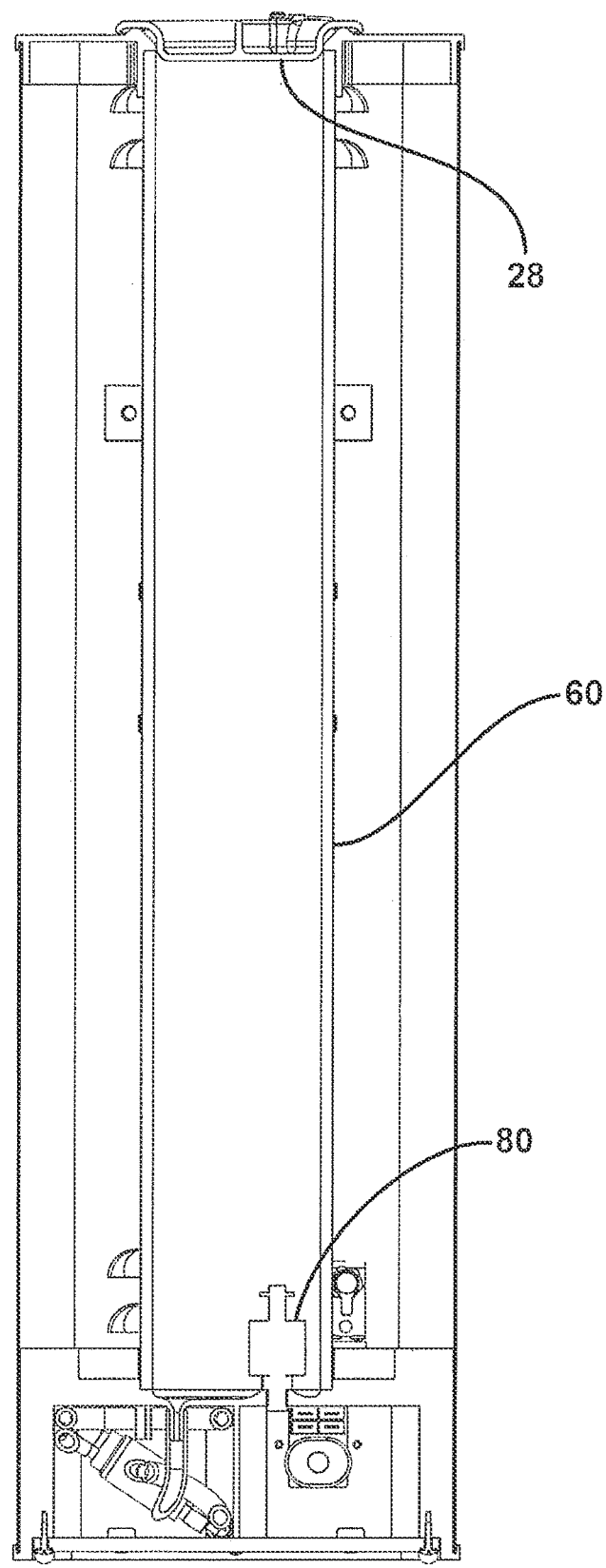
FIG. 18 is a cross-sectional, cut-away view of a preferred built-in fluid reservoir.

FIG. 18 illustrates a preferred built-in reservoir 60 which is used to store fluid, such as water, in the blender 10. For blending frozen milkshakes or smoothies, the inventors have found that it is helpful to insert heated fluid into the cup 20 during the blending process to achieve the desired consistency. Under the control of a microprocessor, this fluid is pumped by pump 62 to the cup 20 through tubes 65, 66 (see, FIG. 3). In an alternative embodiment, fluid from the reservoir 60 can also be used to rinse the blending tool 38 or the entire spindle assembly 30 after each blending process. The reservoir 60 is preferably made from stainless steel or a durable, food-safe plastic.

Figure 19:
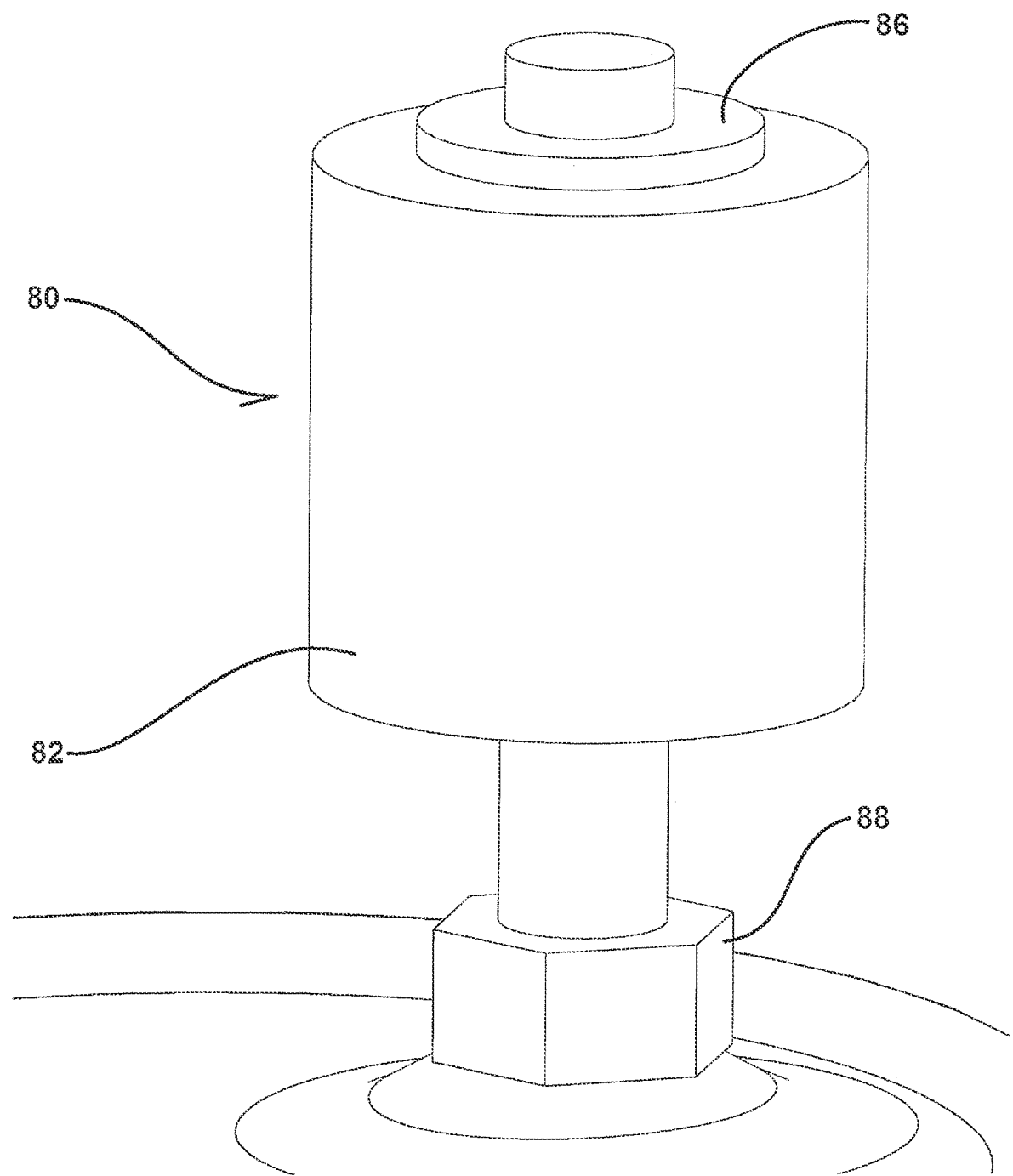
FIG. 19 is a close-up view of a water level sensing float for the built-in fluid reservoir in a raised position.
Figure 20:
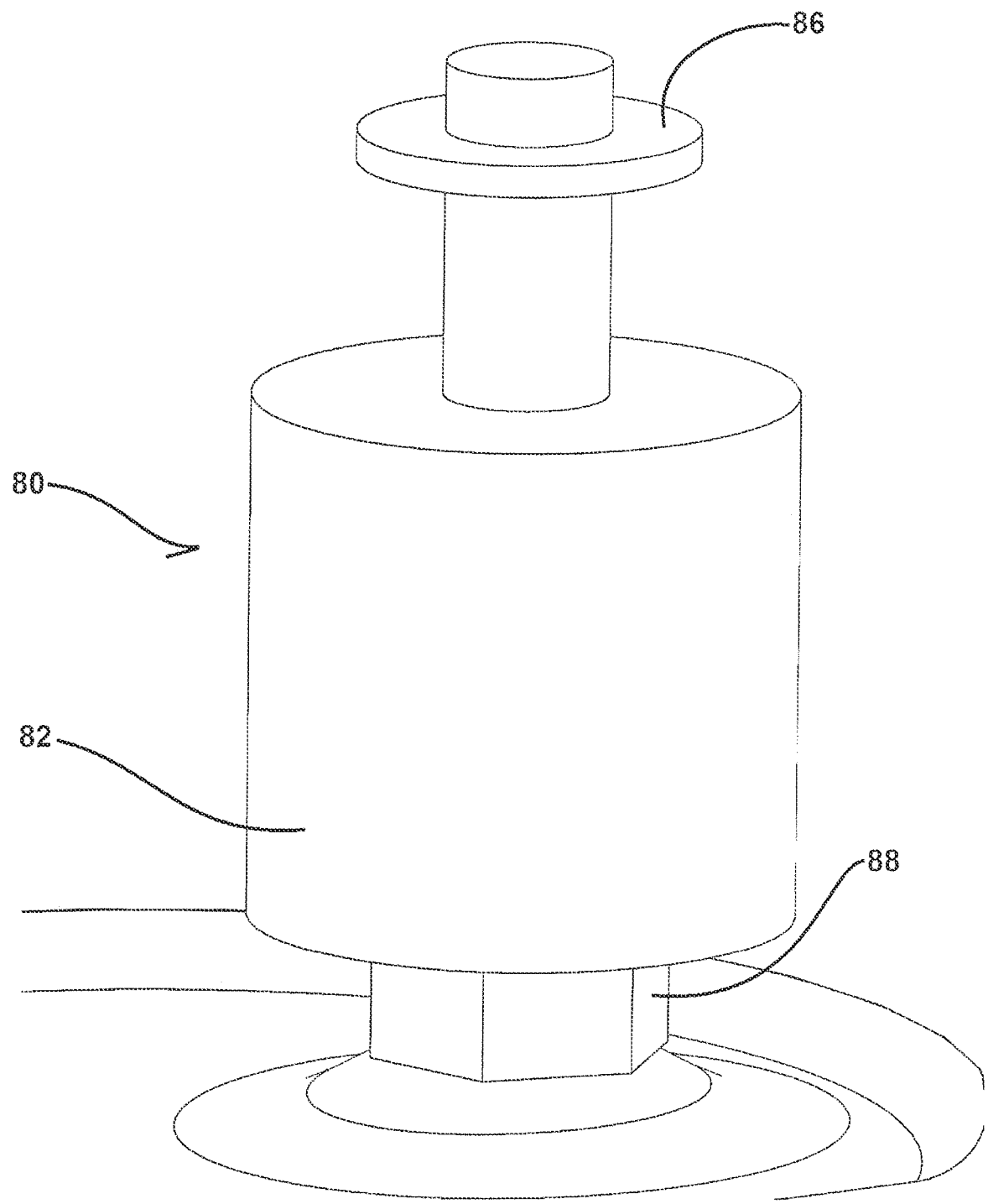
FIG. 20 is a close-up view of a water level sensing float for the built-in fluid reservoir in a lowered position.
Figure 21:
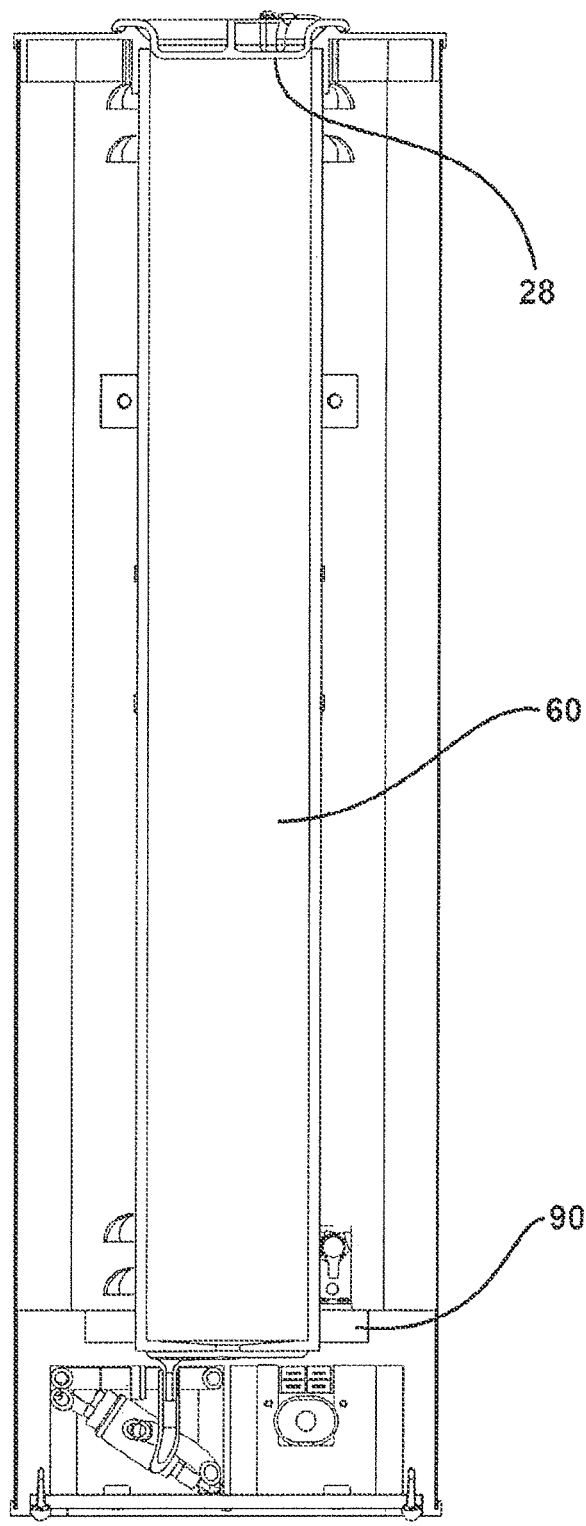
FIG. 21 shows a cross-sectional, cut-away view of an alternative built-in fluid reservoir embodiment.
Figure 22:
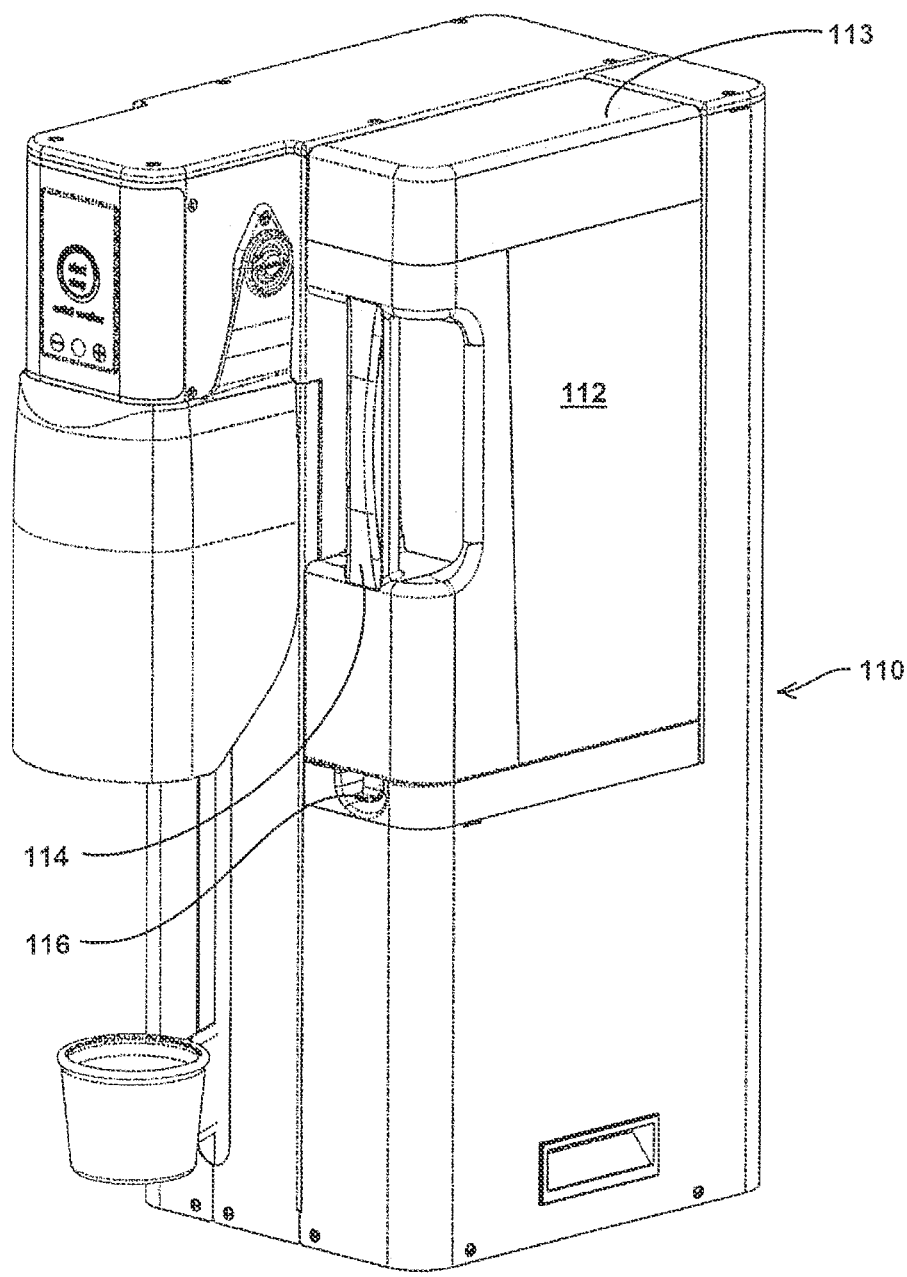
FIG. 22 illustrates an alternative blender of the present invention with a removable fluid reservoir.
Figure 23:
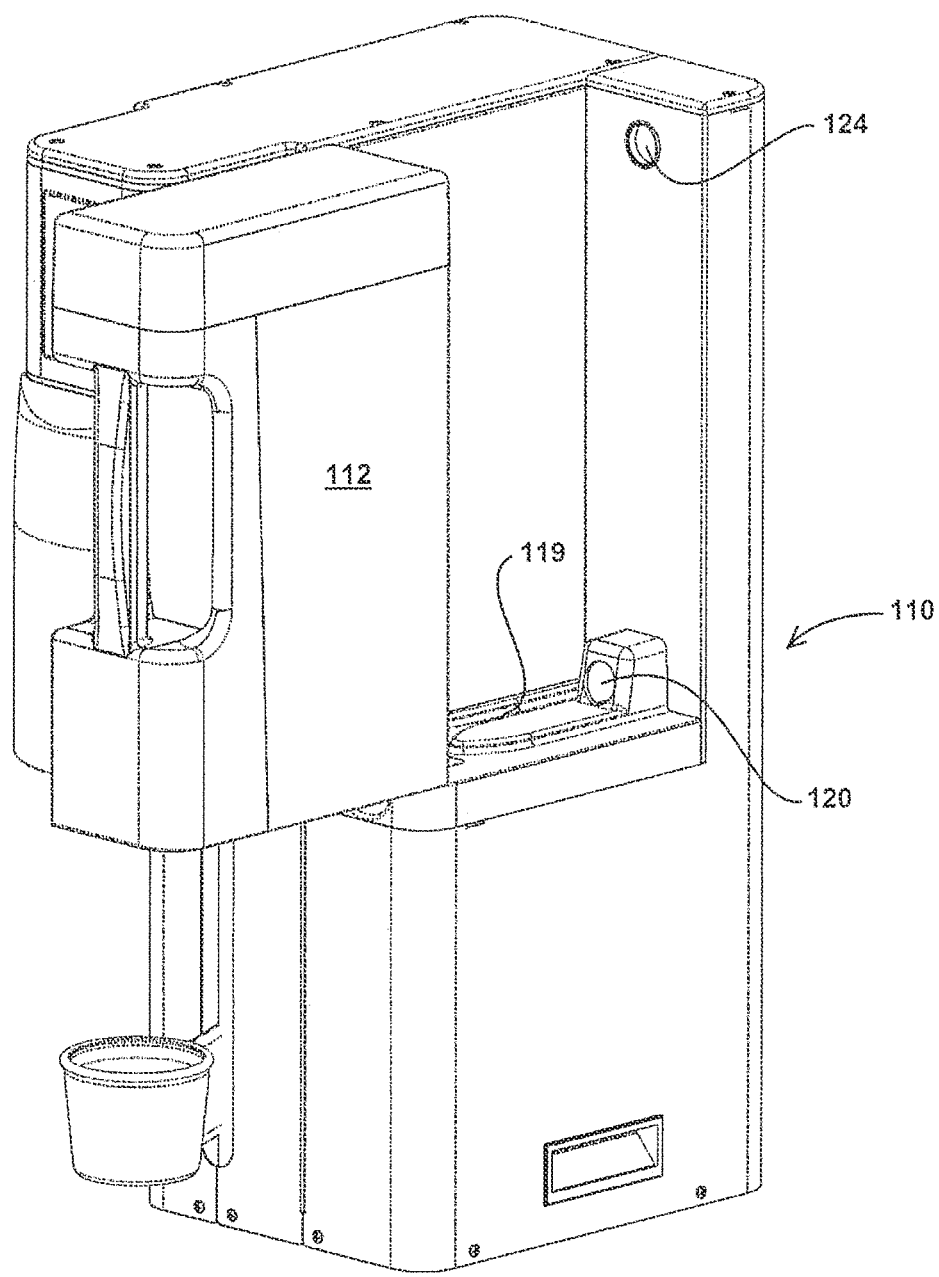
FIG. 23 illustrates how the removable fluid reservoir of the FIG. 22 blender embodiment can be disconnected from the remainder of the blender.

In the embodiment shown in FIG. 18, the built-in reservoir 60 is filled manually by opening reservoir cap 28 and pouring fluid into the top of the reservoir 60. In an alternative embodiment, the reservoir 60 can be connected to a permanently plumbed water line to fill automatically. To prevent the reservoir from inadvertently running dry, a level sensor 80 is preferably built into the bottom of the reservoir 60. In the preferred embodiment, the level sensor is a float sensor 80 as illustrated in FIGS. 19-20. When the fluid level is high, the float 82 will rise as shown in FIG. 19 until it reaches upper stop 86. When the fluid level is low, the float 82 will drop as shown in FIG. 20 until the float reaches lower stop 88. When the float 82 drops to this point, the blender operator will be alerted that the reservoir 60 needs be refilled either by a light 29 on the control panel 22, an audible noise or both. In the alternative embodiment shown in FIG. 21, the level sensor 90 can utilize optical beam, radio wave, capacitive, ultrasound or inductive sensing. For a through beam optical sensor, an optical beam (visible or infrared) is passed through the liquid and the intensity is measured by a receiving sensor. The presence of fluid will attenuate the light intensity as seen by the receiving sensor. A radio wave sensor operates in a similar manner. In a reflective optical beam configuration, the beam of light is reflected at the fluid/air interface in the reservoir and the angle of the reflected light varies with the fluid level. Again, a receiving light sensor measures the angle and determines the fluid level. If there is sufficient fluid in the reservoir, there is no alert signal. If the fluid level is determined to be too low, an alert signal is generated. In a capacitive sensor, the presence of fluid can act as the dielectric layer. The presence (or absence) of fluid between the capacitive plates alters the electrical characteristics of the system. Likewise, an inductive system would detect the change in permeability of fluid or air to determine the water level. As shown in FIG. 21, the ideal sensor 90 does not contact the fluid for sanitary reasons and, thus, would not be located in the reservoir 60 itself.

Periodically, the built-in reservoir 60 should be cleaned. In the embodiment shown in FIG. 18, cleaning can be accomplished by opening the cap 28 and brushing the inside walls of the reservoir 60, preferably with the assistance of a mild cleaning chemical. A drain (not shown) can be provided at the bottom of the reservoir 60 to remove any cleaning chemicals and rinse water before the reservoir is refilled. For purposes of cleaning, use of an optical beam, radio wave, capacitive, ultrasound or inductive level indicator has advantages over the float indicator 80 of the preferred embodiment because these alternative optical beam or radio wave level indicators operate externally to the reservoir 60 and, thus, do not create additional internal surfaces that need to be cleaned.

Figure 24:
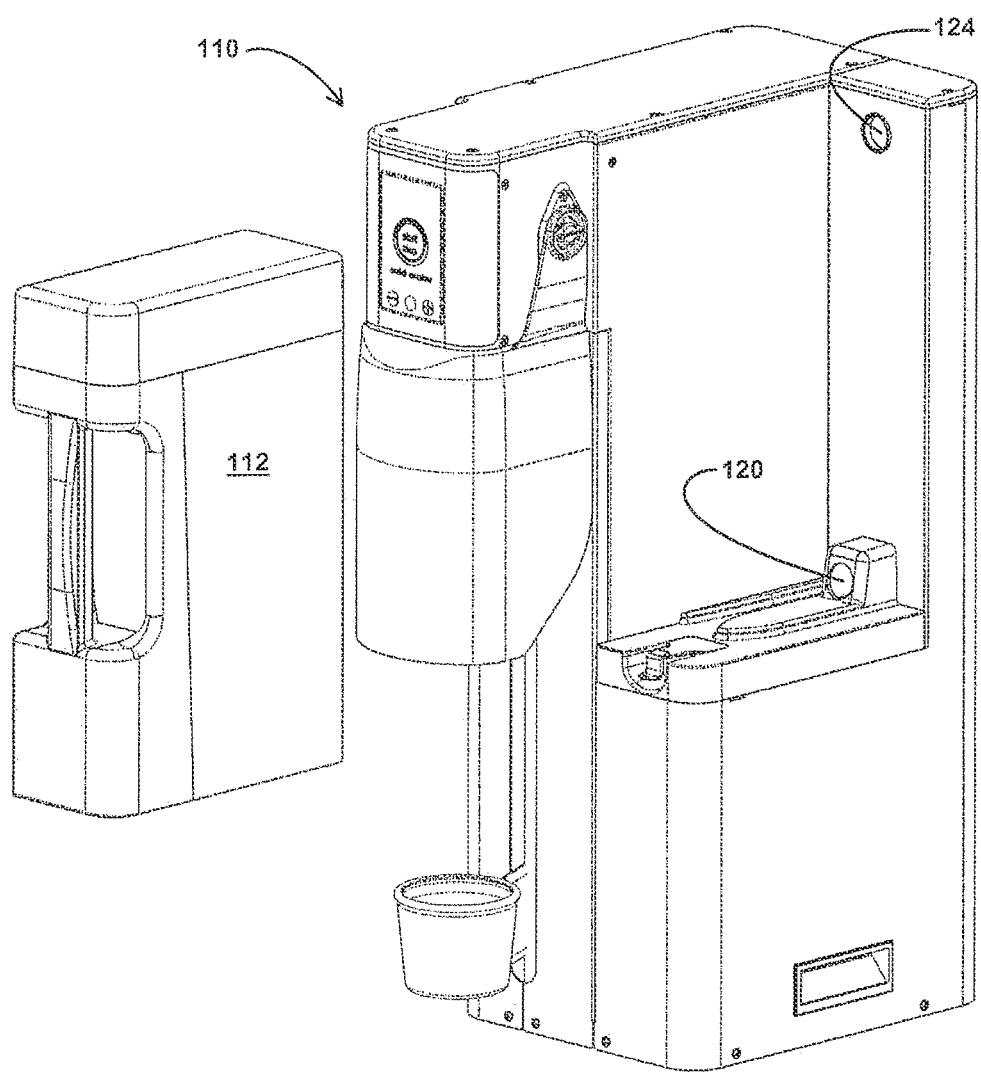
FIG. 24 illustrates the removable fluid reservoir when it is completely detached from the FIG. 22 blender.
Figure 25:
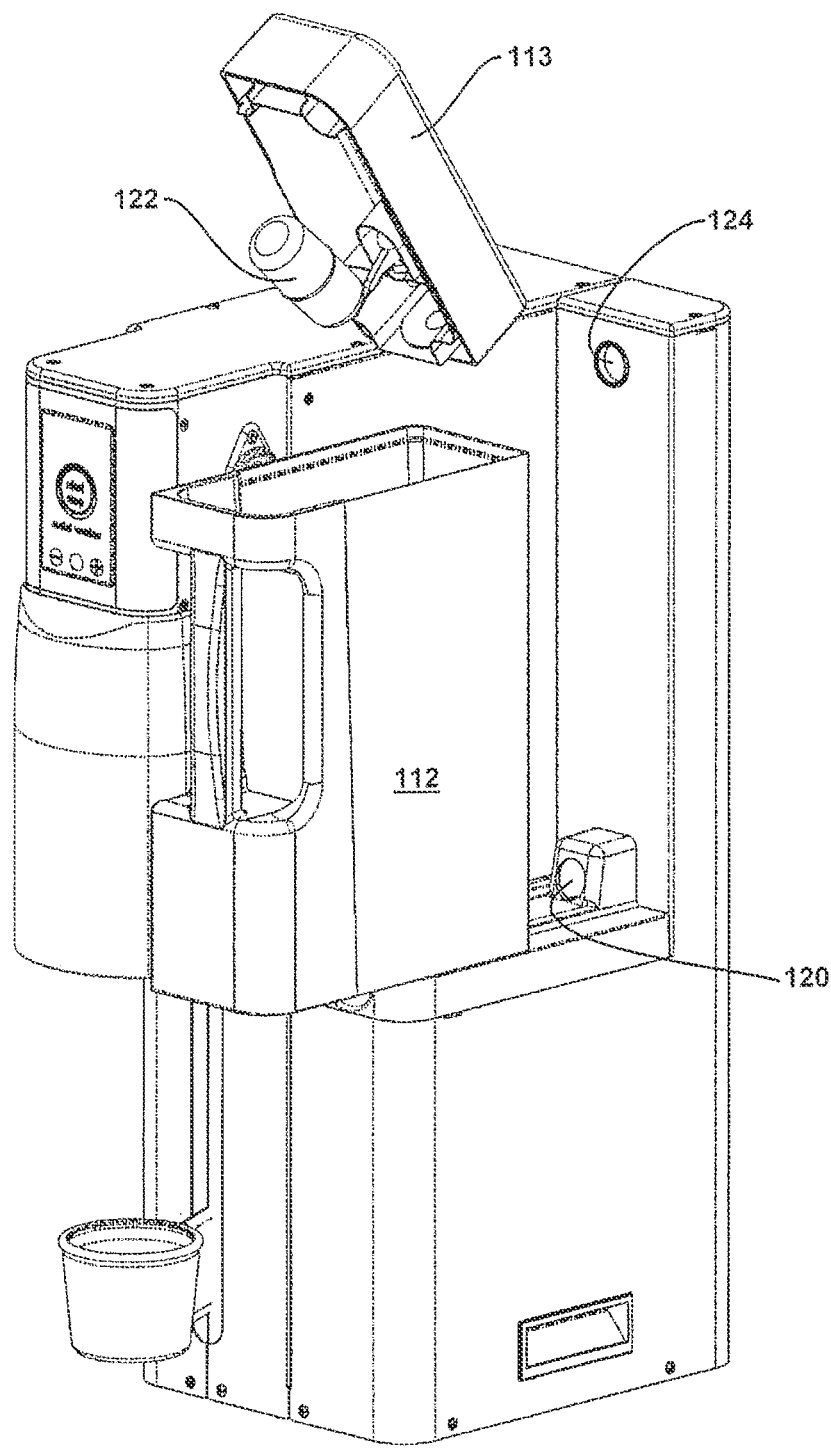
FIG. 25 illustrates how a float valve can be used to control water accumulation in the removable reservoir of FIG. 22 when the blender is plumbed to a water source.

As shown in FIGS. 22-25, a removable reservoir 112 can alternatively be used. In the embodiment shown in FIGS. 22-25, the removable reservoir 112 is built into the side of the blender 110 and has a handle 114 for easy removal and reinsertion. In the embodiment illustrated, one removes the reservoir 112 by pressing down on the snap flex latch 116 with one hand as one pulls on the reservoir handle 114 with the other hand (see, FIG. 22). The removable reservoir 112 will then slide outward on rails 119 (FIG. 23) until it detaches from the rest of the blender (FIG. 24). At that point, the top 113 of the reservoir 112 can be removed to allow the inside of the reservoir 112 to be cleaned. Cleaning can be accomplished by placing the removable reservoir 112 in a dishwasher or using a brush with soap and potable water to manually clean the inside of the reservoir 112. To reinsert the removable reservoir 112 into the blender 110, one simply reverses the order of the steps. One begins by placing the top 113 back on a filled or unfilled reservoir 112, aligning the bottom of the reservoir onto the rails 119 and sliding the reservoir 112 onto the rails 119 until the snap flex latch 116 locks the reservoir 112 back into place.

A water coupler with check valve 120 allows water to flow between the reservoir 112 and the blender 110 when the reservoir 112 is fully attached to the blender 110. The same water coupler with check valve 120 stops water from flowing when the reservoir 112 is not attached to the blender 110. In one embodiment, the reservoir 112 can be manually filled by removing the top 113 and pouring in water. In an alternative embodiment, the removable reservoir is automatically filled by attaching it to a municipal water supply with a permanently plumbed water line through port 124. A water coupler with check valve may also be used in port 124 to insure that water flows into the reservoir 112 only when the reservoir is fully attached to the blender 110. Where the reservoir is being automatically filled from a municipal water supply, a float valve 122 can be used to detect how much water is in the reservoir and automatically shut off flow of water into the reservoir 112 when the water level reaches a pre-determined height.

In the foregoing specification, the invention has been described with reference to specific preferred embodiments and methods. It will, however, be evident to those of skill in the art that various modifications and changes may be made without departing from the broader spirit and scope of the invention as set forth in the appended claims. The specification and drawings are, accordingly, to be regarded in an illustrative, rather than restrictive sense; the invention being limited only by the appended claims.

What is claimed is:

1. A blender comprising:
    a spindle support;
    a spindle motor secured to the spindle support;
    an inner spindle drive shaft permanently coupled to the spindle motor; and
    a spindle assembly removably coupled to the spindle support, the spindle assembly including
        a quick release coupler;
        a tube; and
        a blending tool fixed for co-rotation with an end of the tube, the blending tool including a plurality of blades,
    wherein the inner spindle drive shaft extends into the tube and is drivably coupled to the tube to transmit rotational energy from the spindle motor to the blending tool via the tube when the spindle assembly is coupled to the spindle support.

2. The blender of claim 1, wherein the quick release coupler is disposed about a coupling end of the tube opposite the end of the tube to which the blending tool is fixed.

3. The blender of claim 1, wherein the quick release coupler is a driven coupler, and wherein the inner spindle drive shaft includes a drive coupler configured to be coupled to the driven coupler.

4. The blender of claim 3, wherein the drive coupler is disposed centrally along a length of the inner spindle drive shaft.

5. The blender of claim 3, wherein, when the drive coupler is coupled to the driven coupler, the drive coupler transmits rotational energy to the driven coupler in a first rotational direction and does not transmit rotational energy to the driven coupler in a second rotational direction opposite the first rotational direction.

6. The blender of claim 5, wherein the drive coupler includes a first plurality of teeth, and wherein the driven coupler includes a second plurality of teeth configured to engage the first plurality of teeth to transmit rotation from the drive coupler to the driven coupler.

7. The blender of claim 6, wherein each tooth of the first plurality of teeth and each tooth of the second plurality of teeth includes a ramped edge and a walled edge.

8. A blender comprising:
    a spindle support;
    a spindle motor secured to the spindle support;
    an inner spindle dive shaft driven by the spindle motor; and
    a spindle assembly including
        a tube, and
        a blending tool fixed for co-rotation with an end of the tube, the blending tool including a plurality of blades,
    wherein the inner spindle drive shaft extends into the tube and is drivably coupled to the tube to transmit rotational energy from the spindle motor to the blending tool via the tube.

9. The blender of claim 8, wherein the tube is cylindrical.

10. The blender of claim 8, wherein the inner spindle drive shaft includes a first coupler configured to engage a second coupler on the tube to transmit rotational energy from the inner spindle drive shaft to the tube.

11. The blender of claim 10, wherein the second coupler includes an interior opening such that the inner spindle drive shaft extends through the second coupler.

12. The blender of claim 10, wherein the first coupler includes a first plurality of teeth, and wherein the second coupler includes a corresponding second plurality of teeth configured to engage with the first plurality of teeth.

13. The blender of claim 8, wherein the tube insulates the inner spindle drive shaft from contact with food during operation of the blender.

14. The blender of claim 8, wherein the inner spindle drive shaft and the tube are concentric.

15. A blender comprising:
a spindle support;
a spindle motor secured to the spindle support;
an inner spindle drive shaft driven by the spindle motor; and
a spindle assembly removably coupled to the spindle support, the spindle assembly including
a tube, and
a blending tool fixed for co-rotation with an end of the tube,
wherein the inner spindle drive shaft extends into the tube and is drivably coupled to the tube such that the tube co-rotates with the inner spindle drive shaft, and
wherein the tube insulates the inner spindle drive shaft from contact with food during operation of the blender.

16. The blender of claim 15, wherein the tube has a non-circular cross-sectional shape.

17. The blender of claim 15, wherein the inner spindle drive shaft is drivably coupled to the tube in only one rotational direction.

18. The blender of claim 15, further comprising a cup cover supported by the tube.

19. The blender of claim 15, wherein the inner spindle drive shaft and the tube are concentric.

20. The blender of claim 15, wherein the blending tool includes a radially extendable cutter.

* * * * *